US009740987B2

(12) United States Patent
Dolan

(10) Patent No.: US 9,740,987 B2
(45) Date of Patent: Aug. 22, 2017

(54) GENERATION OF COMPUTER-BASED DISCOVERY AVATARS BASED ON TOKENIZATION OF PRIORITIZED SOURCE DATA

(71) Applicant: GCP IP Holdings I, LLC, Denver, CO (US)

(72) Inventor: Brian Dolan, Los Angeles, CA (US)

(73) Assignee: GCP IP Holdings I, LLC, Denver, CO (US)

( * ) Notice: Subject to any disclaimer, the term of this patent is extended or adjusted under 35 U.S.C. 154(b) by 0 days.

(21) Appl. No.: 14/686,513

(22) Filed: Apr. 14, 2015

(65) Prior Publication Data

US 2015/0220854 A1 Aug. 6, 2015

Related U.S. Application Data

(63) Continuation of application No. 13/480,734, filed on May 25, 2012, now abandoned.

(60) Provisional application No. 61/491,140, filed on May 27, 2011.

(51) Int. Cl.
  *G06N 99/00* (2010.01)
(52) U.S. Cl.
  CPC .................. *G06N 99/005* (2013.01)
(58) Field of Classification Search
  None
  See application file for complete search history.

(56) References Cited

U.S. PATENT DOCUMENTS

| 6,272,507 B1* | 8/2001 | Pirolli | G06F 17/30011 |
| | | | 707/999.005 |
| 6,363,429 B1* | 3/2002 | Ketcham | H04L 65/80 |
| | | | 709/231 |
| 6,938,097 B1* | 8/2005 | Vincent | H04L 12/5693 |
| | | | 370/238 |
| 2002/0196785 A1* | 12/2002 | Connor | H04L 12/5693 |
| | | | 370/392 |

OTHER PUBLICATIONS

Cetintemel et alia. Self-Adaptive User Profiles for Large-Scale Data Delivery. 16th International Conference on Data Engineering. 12 pages. 2000.*

(Continued)

*Primary Examiner* — Lut Wong
*Assistant Examiner* — Robert Bejcek, II
(74) *Attorney, Agent, or Firm* — Setter Roche LLP

(57) ABSTRACT

In embodiments of the present invention improved capabilities are described for developing, training, validating and deploying discovery avatars embodying mathematical models that may be used for document and data discovery and deployed within large data repositories. For example, an avatar may be constructed by machine learning processes, including by processing information related to what types of information analysts find useful in large data sets. Once constructed, an avatar may be deployed as an aid to human intuition in a wide range of analytical processes, such as related to national security, enterprise management (e.g., programs related to sales, marketing, product, promotions, placement, pricing and the like), dispute resolution (including litigation), forensic analysis, criminal, administrative, civil and private investigations, scientific investigations, research and development, and a wide range of others.

16 Claims, 9 Drawing Sheets

(56) References Cited

OTHER PUBLICATIONS

Wan. Design of a Recommendation Filtering System in Mobile Commerce. International Conference on E-Business and Information System Security. 4 pages. 2009.*

Hsu et alia. A Practical Guide to Support Vector Classification. Apr. 15, 2010.*

Allan. Incremental Relevance Feedback for Information Filtering. SIGIR '96 Proceedings of the 19th annual international ACM SIGIR conference on Research and development in information retrieval. pp. 270-278, 1996.*

Sieg at alia. Using Concept Hierarchies to Enhance User Queries in Web-based Information Retrieval. Proceedings of the International Conference on Artificial Intelligence and Applications, IASTED 2004.*

Singhal. Modern Information Retrieval: A Brief Overview. Bulletin of the IEEE Computer Society Technical Committee on Data Engineering. 2001.*

Teevan et alia. Personlizing Search via Automated Analysis of Interests and Activities. SIGIR '05 Proceedings of the 28th annual international ACM SIGIR conference on Research and development in information retrieval, pp. 449-456, 2005.*

Lempel et al. Predictive Caching and Prefetching of Query Results in Search Engines. WWW2003, May 20-24, 2003, Budapest, Hungary. pp. 19-28.*

Burges et al. Learning to Rank using Gradient Descent. Proceedings of the 22nd International Corderence on Machine Learning, Bonn, Germany, 2005. pp. 89-96.*

* cited by examiner

GENERATION OF COMPUTER-BASED DISCOVERY AVATARS BASED ON TOKENIZATION OF PRIORITIZED SOURCE DATA

CROSS-REFERENCE TO RELATED APPLICATIONS

This application is a continuation of U.S. patent application Ser. No. 13/480,734, filed May 25, 2012, which claims the benefit of the following provisional application: U.S. patent application Ser. No. 61/491,140, filed on May 27, 2011, titled "CURIOSITY ENGINE FOR CONTENT DISCOVERY." Each of these references is hereby incorporated by reference in its entirety.

BACKGROUND

Field

The invention is related to data management, discovery, and organization within voluminous data repositories.

Description of the Related Art

With the rapid increase in data creation and the capability to cheaply and reliably store vast volumes of data has come an increasing complexity in organizing, searching and discovering data elements within large data repositories. One result is that traditional techniques for searching data for needed elements, such as keyword searching, Boolean operators, and enhanced search are insufficient to cull wanted data from large data repositories because even a small mismatch between, for example, a keyword and data included in a document, may result in the document being omitted from the search results. Similarly, the presence of a keyword in too many documents within a data stream may result in over-inclusive searching, producing search results that are too voluminous for a human to review in an acceptable amount of time. Further, a keyword match may lack intelligence and produce data query results that combine documents simply on the basis of sharing a word (e.g., "state"), even though that keyword has substantively different meanings in the documents (e.g., "solid state" and "state of mind,"). Also, individuals may have a strong intuitive sense of what information is valuable within a set of results, but may not be able to develop keywords that properly reflect that intuition. Therefore, a need exists for document and data discovery methods and systems that are capable of being trained, that are capable of representing intuitive review processes, that are scalable, and that may be deployed within large data repositories.

SUMMARY

Provided herein are methods and systems for building, modifying, deploying, using and managing one or more computer-implemented avatars, referred to herein in some cases as "discovery avatars," that can assist one or more human analysts in conducting analysis of problems or exploration of topics, where analysis or exploration may include review of one or more source data sets, such as presented to the analysts in one or more data streams. An avatar may be constructed by machine learning processes, including by processing information related to what types of information analysts find useful in large data sets, such that each avatar represents an automated, mathematical representation of an analyst's knowledge and intuition about the relevance of material that appears in such data sets. Once constructed, an avatar as described herein may be deployed as an aid to human intuition in a wide range of analytical processes, such as related to national security, enterprise management (e.g., programs related to sales, marketing, product, promotions, placement, pricing and the like), dispute resolution (including litigation), forensic analysis, criminal, administrative, civil and private investigations, scientific investigations, research and development, and a wide range of others.

In embodiments of the present invention, source data may be tokenized, and from the tokenized data a plurality of data features may be extracted. The extracted data features may be stored as quantitative vectors. The extracted data features may be analyzed using a mathematical model to determine a data cluster, wherein the data cluster includes extracted data features that share an attribute and includes identifiers that are associated with a plurality of data elements from the source data. Continuing the example, a first source datum, from the plurality of data elements from the source data, may be presented for review based at least in part on the identifiers within the data cluster. The first source datum may be scored, rated, or ranked based at least in part on its relevance to a substantive topic. A second source datum from the plurality of data elements from the source data may also be presented, based at least in part on the identifiers within the data cluster, and scored, rated, or ranked based at least in part on its relevance to the substantive topic. The score of the first source datum may be compared to the score of the second source datum, and a mathematical model component of a discovery avatar may be optimized based at least in part on the comparison of scores. Following the optimization of the mathematical model, data may be iteratively selected from the source data and scored, rated, or ranked to further optimize the mathematical model. Upon reaching a threshold of optimization, accuracy, quality, or merit, the optimized mathematical may be saved and/or stored as a computer-based discovery avatar.

In embodiments, the source data may be a stored repository of documents.

In embodiments, the source data may derive from a plurality of distributed data storage repositories.

In embodiments, the tokenization may be white space tokenization.

In embodiments, the scoring may be performed by a human, and the scoring by the human may be quantitatively weighted by a metadatum associated with the human. A metadatum may be a job title, a credential, or some other type of metadatum. The scoring may also be performed by an algorithm.

In embodiments, the discovery avatar may categorize the source data based at least in part on the use of support vector machines.

In embodiments, the discovery avatar may be deployed for use on a second data source to create a second set of data clusters using the optimized model of the discovery avatar.

In embodiments the discovery avatar may be deployed for use on a plurality of data sources to create a plurality of data clusters that are scored and used to rank each of the plurality of data sources according to relevance to the substantive topic.

In embodiments of the present invention, source data may be tokenized and from the tokenized data a plurality of data features may be extracted. The extracted data features may be stored as quantitative vectors. The extracted data features may be analyzed using a mathematical model to determine a data cluster, wherein the data cluster includes extracted data features that share an attribute that is related to a super-set topic, and includes identifiers that are associated with a plurality of data elements from the source data. The data elements from the source data may be presented and scored, rated, or ranked based at least in part on the identifiers within the data cluster relating to the super-set topic. The mathematical model may be optimized based at least in part on a comparison of the scored data elements. Upon reaching a threshold of optimization, accuracy, quality, or merit, the optimized mathematical model may be saved and/or stored as a computer-based discovery avatar parent. A second set of extracted data features may be extracted from the source data that share a second attribute that is related to both the super-set topic and a subset topic. This may result in a second optimized mathematical model that is based on the super-set and subset topics and is stored as a computer-based discovery avatar child.

In embodiments, the subset topic may be defined by terms that are included in a set of terms used to define the super-set topic. In embodiments, the subset topic may be defined by terms that are additive to a set of terms used to define the super-set topic.

In embodiments, the avatar parent may be memorialized and locked from further iterative improvement.

In embodiments, the avatar parent may be deployed as an analytic commodity for use on a third source of data.

In embodiments, the genealogy of avatar parent-avatar child relations may be presented in a graphic user interface.

In embodiments, an attribute of a first mathematical model inherent in a first computer-based discovery avatar may be identified that is relevant to a second mathematical model inherent in a second computer-based discovery avatar. A second attribute from the first mathematical model inherent in the first computer-based discovery avatar may be incorporated within the second computer-based discovery avatar to create a cross-trained mathematical model in the second computer-based discovery avatar. The cross-trained mathematical model may then be validated by deploying the second computer-based discovery avatar on a set of source data substantially similar to source data on which the first computer-based avatar was developed, wherein the validation is confirmed based at least in part on a comparison of data clusters derived using the first discovery avatar and data clusters derived using the cross-trained mathematical model of the second computer-based discovery avatar.

In embodiments, the relevance of the at least one attribute may be based at least in part on a quantitative association to a substantive topic inherent to a data source.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

While the invention has been described in connection with certain preferred embodiments, other embodiments would be understood by one of ordinary skill in the art and are encompassed herein.

All documents referenced herein are hereby incorporated by reference.

DETAILED DESCRIPTION

Figure 1:
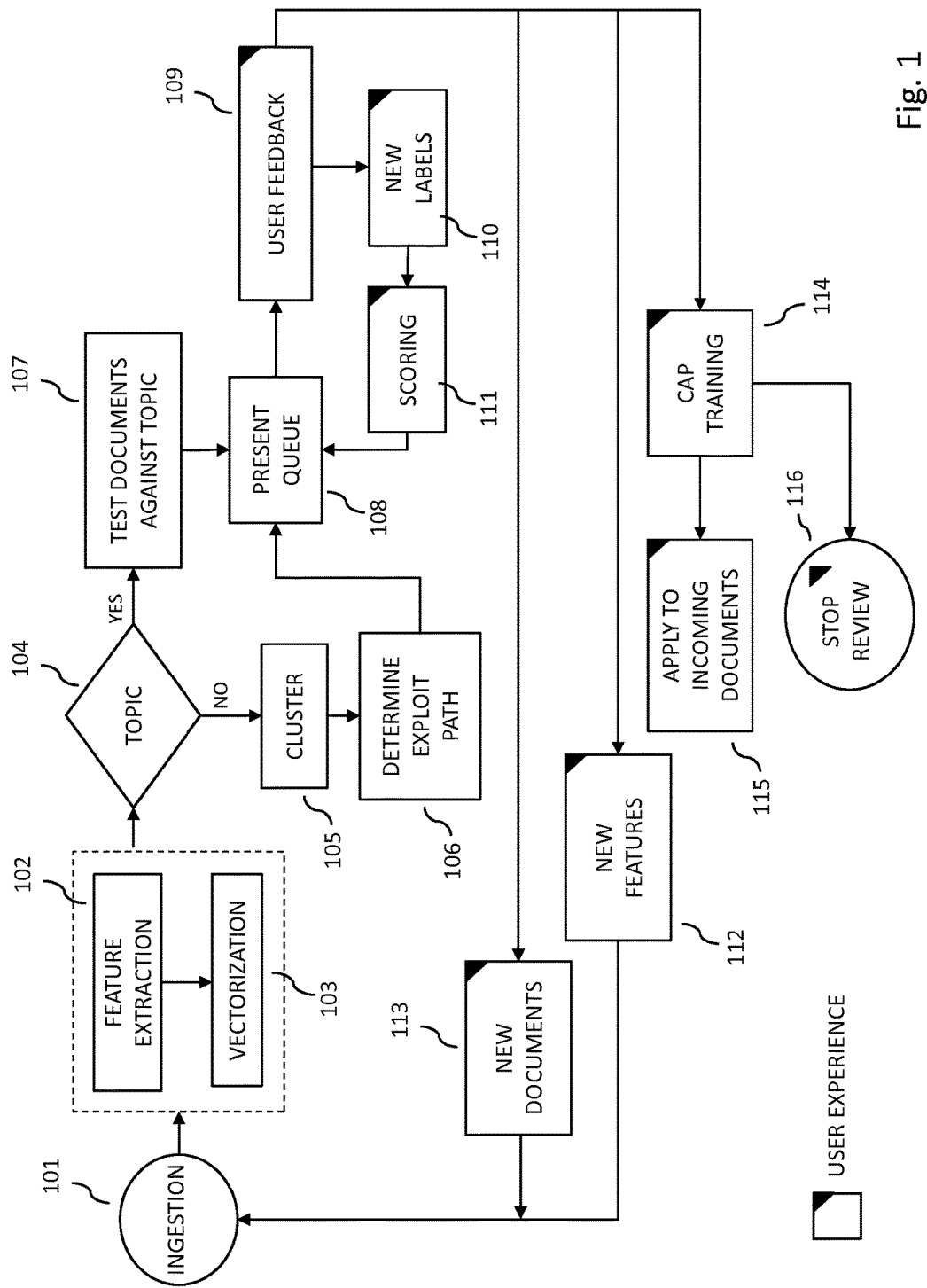
FIG. 1 illustrates a simplified diagram of a Curiosity Engine method and system for the creation and training of discovery avatars.

Referring to FIG. 1, in embodiments of the present invention, a computer-based discovery avatar may be created based at least in part on starting with a data ingestion 101 or entry phase in which a set of data are selected to be used for creating and training a discovery avatar. In embodiments, data ingestion 101 may be performed using a web crawler or any search engine combined with a data storage system. An example paradigm may include a combination such as, but not limited to, a web search software tool such as the open source tool NUTCH® provided by APACHE® and a search server, such as the Solr search tool provided by APACHE®, which is based on the Lucene Java search library. Such a paradigm may use a distributed storage and computation tool such as the open source HADOOP™ framework from APACHE®. In various embodiments, a wide variety of tools known to those of ordinary skill in the art may be used to extract, transform, load and store data from disparate sources into one or more formats suitable for ingestion by a discovery avatar, including in situations using distributed storage and computation capabilities. Similarly, various known techniques for normalizing, de-duplicating, error correcting, and otherwise cleansing input data sets may be used to provide a discovery avatar with a consistent, clean data set for its use.

A discovery avatar's point of ingesting data may be conceptualized as a gate (hereinafter, "Pantheon") to the discovery avatar. As data pass through the Pantheon, a discovery avatar works to extract 102 features from data. Data feature extractors may include, but are not limited to, custom Java® or Python™ or similar programming processes that use Natural Language Processing to identify key elements of a document. Once data features are extracted 102, the discovery avatar software may again compute to transform documents and/or document elements (such as tokenized data derived from documents) into vectors 102 for further analysis, such as deriving clusters 105 that relate to a topic 104 of interest that is used by the Curiosity Engine, as described herein, to develop, train, optimize and store discovery avatars. These vectors may be very high dimensional mathematical objects. Statistical techniques, such as variants of k-means clustering and LDA+Topic modeling may be used to create data clusters 105 and/or document clouds. The discovery avatar may take the largest member inn-space of each data cluster 105 or data cloud, the second largest member, and so forth, until a human user provides sufficient feedback for the supervised learning of the discovery avatar. Supervised Learning routines such as Support Vector Machines may be trained according to a human-user-specified topic 104, and used to queue 108 and score 111 data and/or documents, such as test documents 107, from a data source according to a relevance to the specified topic. These scores may then be used to determine a subset of the data and/or documents to present to the user for feedback 109. Once the user is presented with a list of documents selected by the discovery avatar, the user may label documents 110 as relevant or not as it pertains to a particular topic. New labels 110 may indicate the need for new vectors or new training of additional discovery avatars focused on other topics that are discovered in the data source. The discovery avatar may provide relevance scores for both labeled and unlabeled documents. The former may be done for the purpose of precision and recall ROC curves. In embodiments, users may add new or custom features 112 including, but not limited to, timestamps on files to word-pair proximity (e.g., how far is the word "analytic" from "engine"? New documents 113 may enter the system and be prepared for examination by the discovery avatar. Once a discovery avatar is trained and is performing well, a user may choose to cap the training 114, stop further review 116, and lock and memorialize the discovery avatar and allow no further influence the mathematical model of the avatar. The mathematical model used by the discovery avatar may be applied to incoming documents 115 before they are fully ingested and allow the user the option of adding them to the corpus. A data corpus may be determined "complete" and memorialized with a set of discovery avatars.

In embodiments, the present invention may provide for an avatar for modeling iterative investigation, such as for obtaining an indication of some elements of a data stream that are perceived to be helpful to at least one human analyst conducting an investigation, and characterizing the helpful elements in a computer-based avatar that manages the queue of additional data stream elements to improve the quality of the data stream for the analyst, and the like. In embodiments, managing the queue may include ordering, ranking, filtering, clustering, and the like, the data stream elements.

In embodiments, the present invention may provide for a discovery avatar for modeling iterative investigation, such as for constructing a computer-based avatar that manages a queue of data stream elements to aid at least one human analyst who is conducting an investigation, such as including tokenizing source data within a data stream presented to an analyst such that the source data may be extracted based on a topic. A topic of investigation may be identified by the analyst, and a set of source data extracted and queued that is related to the topic. Items within the set of source data may initially be rated by the human analyst the ratings allowing formation of a computer-based avatar for the topic that is based on the human ratings of the source data. The avatar may then be used to queue additional source data, and the avatar may be iteratively improved by a set of cycles of avatar formation, queuing, and analyst rating; and the like, such that with each cycle the avatar increasingly reflects the human ratings, which may be based on explicit intent, intuition, or a combination of both.

In embodiments, the present invention may provide for a discovery avatar for modeling iterative investigation. Once a sufficient number of iterations have been conducted (as judged by human evaluation of the quality of the avatar or by comparison (optionally automated) of the performance of the avatar against a performance metric, an avatar may be locked and/or memorialized, so that in future usage the avatar is used to queue data within new data sets for an analyst, but the avatar itself remains unchanged. For instance, an indication may be obtained of some elements of a data stream that are perceived to be helpful to at least one human analyst who is conducting an investigation on a topic. The helpful elements may be characterized in a computer-based avatar that manages a queue of additional data stream elements to improve the quality of the data stream for the topic, and a topical avatar may be iteratively improved through a series of rounds of human review and rating of the elements presented in the managed queue. A version of the avatar for the topic may be locked after such improvement. A locked avatar might, for example, represent the intuition of a particular analyst, such as a very skilled police investigator or intelligence analyst, who is perceived to have unique knowledge, training or insight when reviewing potentially relevant information. Future analysts may thus benefit from the knowledge of past expert analysts by receiving data sets that are queued according to the ratings of the past expert.

In embodiments, the present invention may provide for a discovery avatar for modeling iterative investigation, such as for using the avatar as a commodity. For instance, an indication of some elements of a data stream may be obtained that are perceived to be helpful to at least one human analyst conducting an investigation on a topic. The helpful elements may be characterized in a computer-based avatar that manages the queue of additional data stream elements to improve the quality of the data stream presented to the analyst for the topic. The formulation of the avatar may be stored as a computing element that can be deployed by another. In embodiments, the stored avatar computing element may be an application that can be deployed as a commodity, a mathematical summary of the elements of the data stream and their relation to the topic, and the like. The mathematical summary of the elements of the data stream may be based at least in part on an algorithmic modeling of tokenized elements from the data stream.

In embodiments, the present invention may provide for a discovery avatar for modeling iterative investigation, such as an avatar that is used for a group of participants. For instance, an indication may be obtained of some elements of a data stream that are perceived to be helpful to a plurality of human participants who are contributing to at least one analytic investigation, characterizing the helpful elements in a computer-based avatar that manages the queue of additional data stream elements to improve the quality of the data stream for the participants in the investigation, and the like. In embodiments, each member of the group may participate in rating documents, with the collective ratings being used to form the mathematical representation that comprises the avatar and that is used to queue future information. The contributions or ratings of group members may be weighted, such that, for example, a supervisor's ratings, or the ratings of a more experienced person, are provided with more weight as compared to a less experienced or junior person. In embodiments a group avatar may be trained and locked, but variants may be spawned and maintained as "children," such as for each of the group participants, such that a data flow might be initially queued based on the group avatar, then shuffled based on the preferences of a particular member of the group.

In embodiments preferences may be specified by an analyst in a rule-based manner, in conjunction with a process that uses a discovery avatar. For example, an analyst might declare a rule to see all documents of a certain type first, notwithstanding what would otherwise be queued for the analyst based on past ratings. Thus, an avatar may be used in a compound analytic data presentation process where data queued by the avatar may be presented together with data found in other ways, such as conventional web searching, database queries, or the like.

In embodiments, the present invention may provide for a discovery avatar for modeling iterative investigation, such as in conjunction with question-based call and response of human experts. For instance, an indication may be obtained of some elements of a data stream that are perceived to be helpful to at least one human analyst who is conducting a question-based investigation, characterizing the helpful elements in a computer-based avatar that manages the queue of additional data stream elements to improve the quality of the data stream for the analyst with respect to the topic to which the questions relates, and the like. In embodiments, this may form the topic that is the investigative purpose of the discovery avatar.

In embodiments, the present invention may provide for a discovery avatar for modeling iterative investigation, such as using a trained avatar as a mathematical model, deployable, scalable, and the like, and which may not be reliant on the document source on which it was trained. For instance, an indication may be obtained of some elements of a data stream that are perceived to be helpful to at least one human analyst who is conducting an investigation on a topic. The helpful elements may be characterized in a computer-based avatar that manages the queue of additional data stream elements to improve the quality of the data stream presented to the analyst for the topic, and the formulation of the avatar may be stored as a mathematical model-based computing element that can be deployed on another stream independent of the data stream on which it was trained, and the like.

In embodiments, the present invention may provide for constructing a longitudinal avatar, such that manages a queue of data stream elements to aid at least one human analyst conducting an investigation, including tokenizing source data within a data stream presented to an analyst such that the source data may be extracted based on a topic. A topic of investigation may be identified by the analyst, and a set of source data may be extracted and queued related to the topic. The set of source data may then be rated by the human analyst, or a computer running an algorithm, and a computer-based discovery avatar for the topic may be formed based on the human ratings of the source data, wherein the human ratings are mathematically weighted according to a criterion. The discovery avatar may be used to queue additional source data, facilitating analyst rating of the additional source data, and the discovery avatar may be iteratively improved by a set of cycles of avatar formation, queuing, and analyst rating; and the like. In embodiments, the criterion may be used to mathematically weight the human rating based the date of the human rating, expertise of human, title of human, and the like.

In embodiments, the present invention may provide for a user and/or management interface for an avatar for modeling an iterative investigation, such as in a computer program product embodied in a non-transitory computer readable medium that, when executing on one or more computers, may perform the steps of presenting an interface that is enabled to manage a computer-based avatar, wherein the avatar is a mathematical summary of data stream elements that is based at least in part on an algorithmic modeling of tokenized elements from the data stream. A parameter selection may be received from a user of the interface, wherein the parameter relates at least in part to a criterion on which the mathematical summary is based. A visualization of the criterion may be presented to the interface. In embodiments, the criterion may be a data source, a date, or some other type of data. The visualization may depict a longitudinal trend relating to the criterion, a comparison of a first criterion with a second criterion (e.g., Data Source 1 with Data Source 2), and the like.

In embodiments, the present invention may provide for parent-child avatars for modeling iterative investigation, such as in a method of constructing a computer-based discovery avatar that may manage a queue of data stream elements to aid at least one human analyst conducting an investigation, including tokenizing source data within a data stream presented to an analyst such that the source data may be extracted based on a super-set topic. A super-set topic of investigation may be identified by the analyst, and a set of source data related to the super-set topic may be extracted and queued. The human analyst may rate the set of source data, forming a computer-based parent-avatar for the super-set topic based on the human ratings of the source data. A second set of source data may then be tokenized such that the second set of source data may be extracted based on a subset topic relating at least in part to the super-set topic; using the avatar to queue additional source data from the source data and the second set of source data, facilitating analyst rating of the additional source data, and iteratively improving a child-avatar by a set of cycles of avatar formation, queuing, and analyst rating, wherein the cycles of formation queuing and analyst rating are based at least in part on the superset topic and subset topic. In embodiments, the second set of source data may be a subset of the set of source data, an additive to the set of source data, and the like. The parent avatar may be memorialized and locked from further iterative improvement. The parent avatar may be deployed as an analytic commodity for use on a third source of data. The genealogy of parent-child avatar relations may be tracked/visualized (e.g., "Korea" and "Japan" avatars branching from an "East Asia Industrial Organization" avatar).

In embodiments, discovery avatars may be capable of communicating with one another, in order to find hidden patterns, mathematical similarities, topical relationships, connections and correlations between their models and the content they explore. This cross-avatar communication may result in relevant alerts and, where appropriate, information sharing between avatars. Avatars may alert their users where there are other avatars and research topics relevant to their own existing topics and research. By analogy, the avatars may exist within an avatar social network in which the avatars to communicate, locate, identify and "friend" (i.e., initiate a social networking-based relationship) other avatars in a manner similar to humans within a social network identifying and "friending" other humans with whom they, for example, share an interest (i.e., topic). The friending of avatars may enable nuanced recommendations to users. The friending that occurs among avatars may also enable users to learn from other users that they may not otherwise be in communication with.

In embodiments, the present invention may provide for avatar cross-training, such as a method of optimizing a computer-based discovery avatar, including automating identification of at least one common attribute of at least one mathematical model inherent in a first computer-based avatar and at least one mathematical model inherent in a second computer-based avatar, and incorporating a second attribute from at least one mathematical model inherent in the first computer-based avatar within the second computer-based avatar to create a cross-trained mathematical model in the second computer-based avatar. The cross-trained mathematical model may then be validated by deploying the second computer-based avatar on a set of source data substantially similar to source data on which the first computer-based avatar was developed/trained.

In embodiments, the present invention may provide for an avatar-search hybrid facility, such as a method of constructing a computer-based avatar that manages a queue of data stream elements to aid at least one human analyst conducting an investigation, including tokenizing source data within a data stream presented to an analyst such that the source data may be extracted based on a topic; identifying a topic of investigation by the analyst, wherein the topic identification is further assisted using collaborative filtering based at least in part on a concordance of a stored data attribute relating to the analyst and a second stored data attribute relating to at least one other human. A set of source data related to the topic may then be extracted and queued, facilitating rating of the set of source data by the human analyst. A computer-based discovery avatar for the topic may be formed based on the human ratings of the source data, and the discovery avatar used to queue additional source data, further facilitating analyst rating of the additional source data. The discovery avatar may then be iteratively improved by a set of cycles of avatar formation, queuing, and analyst rating. In embodiments, the stored data attribute may be a job title, a credential, and the like.

In embodiments, the present invention may provide for a discovery avatar may be deployed in different data venues including, but not limited to, the Internet, enterprise data systems, distributed storage, cloud-based storage, or some other data source or repository.

In embodiments, the present invention may provide for a spiral processing method for populating a discovery avatar that may be used for modeling an iterative investigation, such as a method of constructing a topic for a computer-based avatar that manages a queue of data stream elements to aid at least one human analyst conducting an investigation. The method may include tokenizing source data within a data stream, wherein a priority is given to tokenizing larger data components within the data stream over smaller data components. Extracting topic clusters from the source data, wherein the extracted topic clusters are formed based at least in part on a frequency of keyword occurrence, or "magnitude," of topic prevalence. Identifying a topic of interest from the extracted topic clusters, and queuing a set of source data related to the topic of interest. The topic of interest may then be validated by rating the set of source data by a human analyst; computer algorithm, or some other scoring, rating, or ranking method or system.

Figure 2:
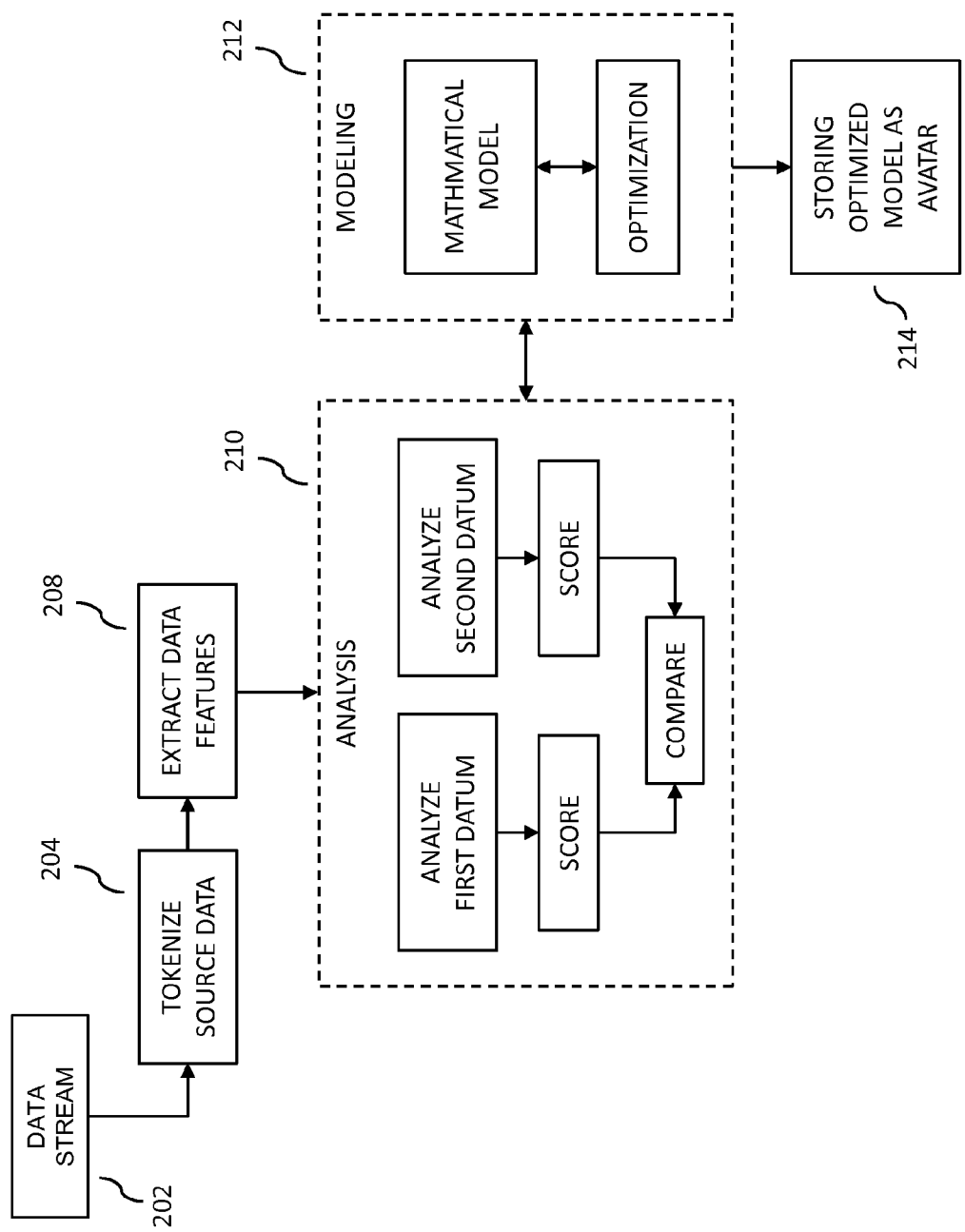
FIG. 2 illustrates an embodiment of discovery avatar development and optimization.
Figure 3:
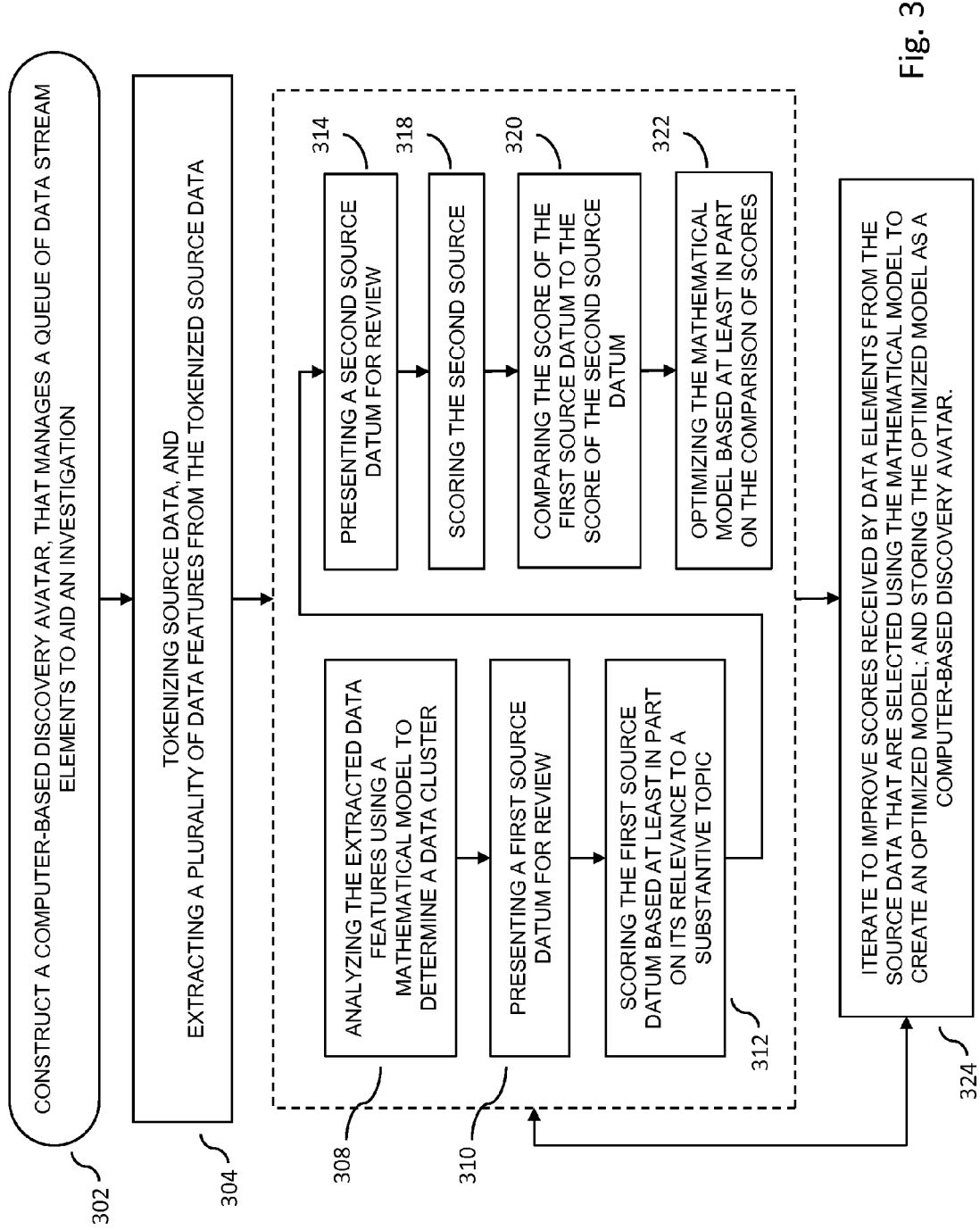
FIG. 3 illustrates steps for developing, optimizing and storing a discovery avatar.

Referring to FIGS. 2 and 3, in embodiments of the present invention, source data from a data stream 202 may be tokenized 204, and from the tokenized data a plurality of data features may be extracted 208. The extracted data features may be analyzed 210 and stored as quantitative vectors. The extracted data features may be analyzed using a mathematical model to determine a data cluster, wherein the data cluster includes extracted data features that share an attribute and includes identifiers that are associated with a plurality of data elements from the source data. Continuing the example, a first source datum, from the plurality of data elements from the source data, may be presented for review based at least in part on the identifiers within the data cluster. The first source datum may be scored, rated, or ranked based at least in part on its relevance to a substantive topic. A second source datum from the plurality of data elements from the source data may also be presented, based at least in part on the identifiers within the data cluster, and scored, rated, or ranked based at least in part on its relevance to the substantive topic. The score of the first source datum may be compared to the score of the second source datum, and a mathematical model component of a discovery avatar may be optimized based at least in part on the comparison of scores 212. Following the optimization of the mathematical model, data may be iteratively selected from the source data and scored, rated, or ranked to further optimize the mathematical model. Upon reaching a threshold of optimization, accuracy, quality, or merit, the optimized mathematical may be saved and/or stored as a computer-based discovery avatar 214.

In embodiments, the source data may be a stored repository of documents.

In embodiments, the source data may derive from a plurality of distributed data storage repositories.

In embodiments, the tokenization may be white space tokenization.

In embodiments, the scoring may be performed by a human, and the scoring by the human may be quantitatively weighted by a metadatum associated with the human. A metadatum may be a job title, a credential, or some other type of metadatum. The scoring may also be performed by an algorithm.

In embodiments, the discovery avatar may categorize the source data based at least in part on the use of support vector machines.

In embodiments, the discovery avatar may be deployed for use on a second data source to create a second set of data clusters using the optimized model of the discovery avatar.

In embodiments the discovery avatar may be deployed for use on a plurality of data sources to create a plurality of data clusters that are scored and used to rank each of the plurality of data sources according to relevance to the substantive topic.

FIG. 3 illustrates steps for developing, optimizing and storing a discovery avatar. As illustrated in FIG. 3, a computer-based discovery avatar is constructed in 302. The computer-based discovery avatar can manage a queue of data stream elements to aid an investigation. In 304, the source data is tokenized and a plurality of data features can be extracted from the tokenized source data. Features of the extracted data can be analyzed in 308 using a mathematical model to determine a data cluster. In 310, a first source datum is presented for review. The first source datum can be scored in 312 based at least in part on its relevance to a substantive topic. In 314, a second source datum may be presented for review and scored in 318. The score of the first source datum can be compared to the score of the second source datum in 320. The mathematical model can then be optimized in 322 based, at least in part, on the comparison of scores. To improve the scores received by data elements from the source data, 308 through 322 can be repeated and the optimized model can be stored as a computer-based discovery avatar in 324.

Figure 4:
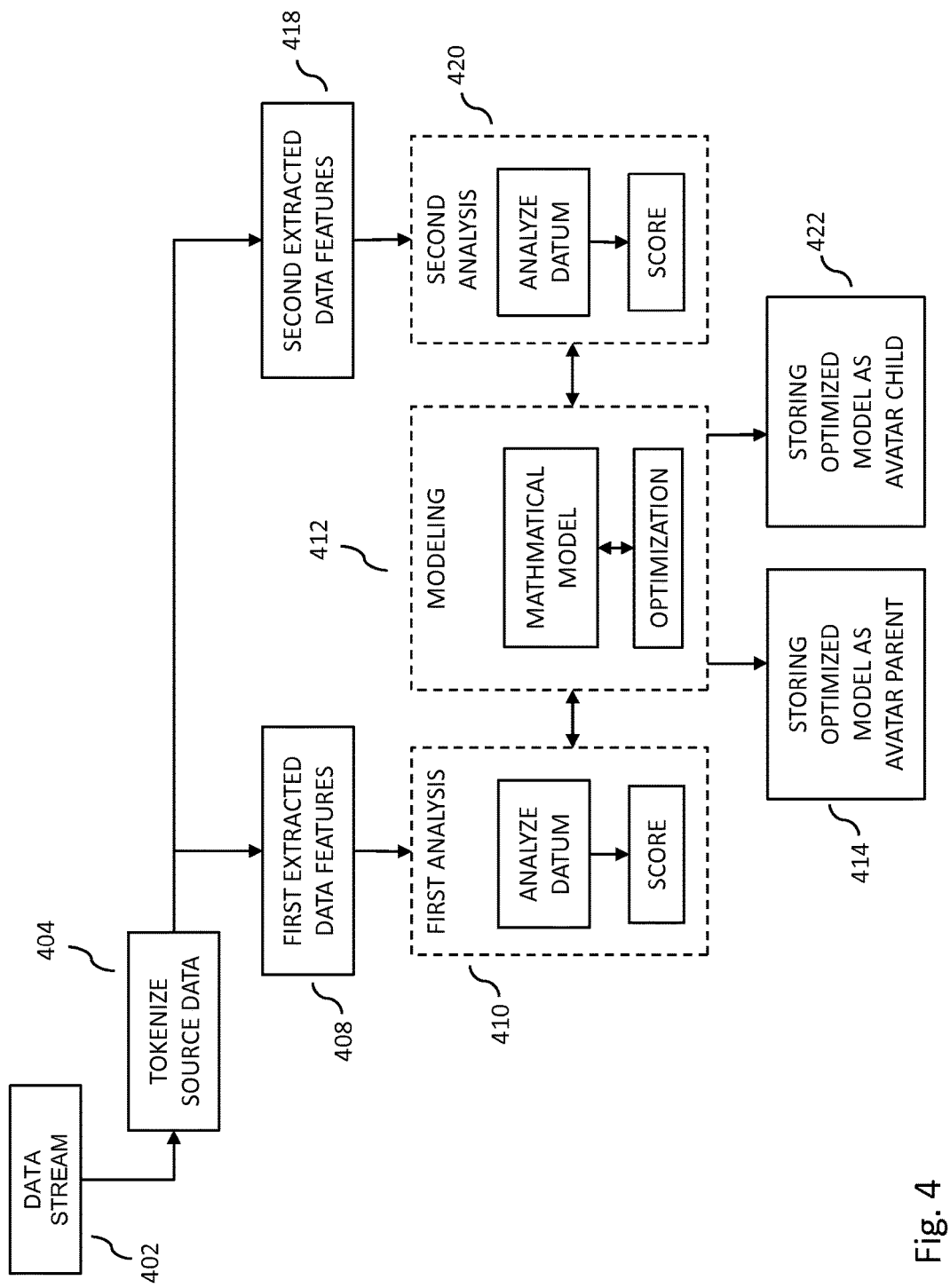
FIG. 4 illustrates an embodiment of avatar-parent and avatar-child development and optimization.
Figure 5:
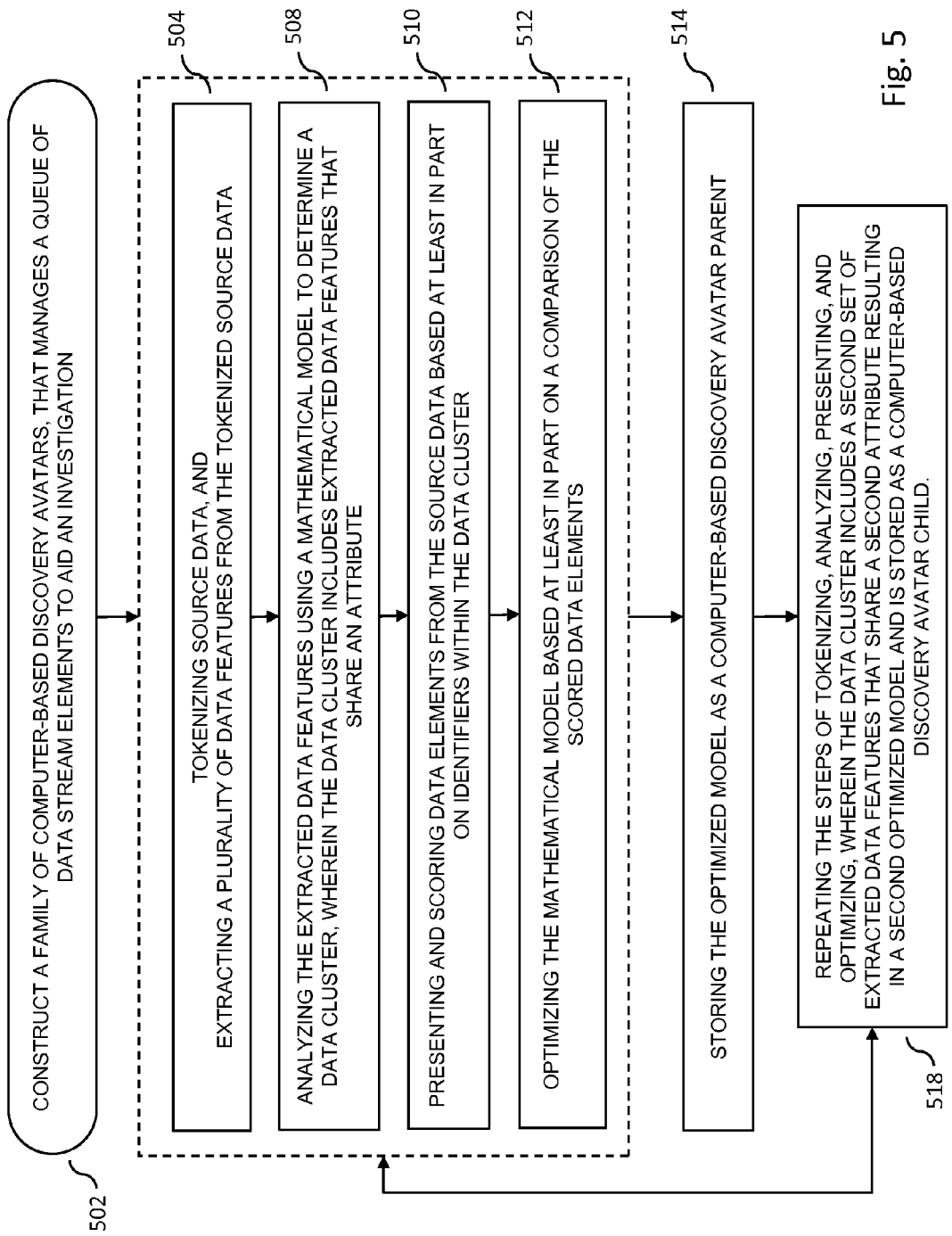
FIG. 5 illustrates steps for developing, optimizing and storing a discovery avatar-parent and a discovery avatar-child that is related to the discovery avatar-parent.

Referring to FIGS. 4 and 5, in embodiments of the present invention, source data, such as from a data stream 402, may be tokenized 404 and from the tokenized data a plurality of data features may be extracted 408. The extracted data features may be stored as quantitative vectors. The extracted data features may be analyzed 410 and modeled 412, using a mathematical model to determine a data cluster, wherein the data cluster includes extracted data features that share an attribute that is related to a super-set topic, and includes identifiers that are associated with a plurality of data elements from the source data. The data elements from the source data may be presented and scored, rated, or ranked based at least in part on the identifiers within the data cluster relating to the super-set topic. The mathematical model may be optimized based at least in part on a comparison of the scored data elements. Upon reaching a threshold of optimization, accuracy, quality, or merit, the optimized mathematical model may be saved and/or stored as a computer-based discovery avatar parent 414. A second set of extracted data features 418 may be extracted from the source data 402 that share a second attribute that is related to both the super-set topic and a subset topic. This may be analyzed in a second analysis 420 and result in a second optimized mathematical model that is based on the super-set and subset topics and is stored as a computer-based discovery avatar child 422.

In embodiments, the subset topic may be defined by terms that are included in a set of terms used to define the super-set topic. In embodiments, the subset topic may be defined by terms that are additive to a set of terms used to define the super-set topic.

In embodiments, the avatar parent may be memorialized and locked from further iterative improvement.

In embodiments, the avatar parent may be deployed as an analytic commodity for use on a third source of data.

In embodiments, the genealogy of avatar parent-avatar child relations may be presented in a graphic user interface.

FIG. 5 illustrates steps for developing, optimizing and storing a discovery avatar-parent and a discovery avatar-child that is related to the discovery avatar-parent. As illustrated in FIG. 5, a family of computer-based avatars can be constructed in 502. The family of discovery avatars can manage a queue of data stream elements to aid an investigation. In 504, the data source is tokenized and a plurality of data features from the tokenized source data can be extracted. In 508, the extracted data features can be analyzed using a mathematical model to determine a data cluster. The data cluster can include extracted data features that share an attribute. In 510, data elements form the source data can be presented and scored based, at least in part, on identifiers within the data cluster. In 512, the mathematical model can be optimized, based, at least in part, on a comparison of the scored data elements. The optimized model can be stored in 514 as a computer-based discovery avatar parent. Steps 504-512 can be repeated in 518. The data cluster can include a second set of extracted data features that share a second attribute resulting in a second optimized model. The optimized model can then be stored as a computer-based discovery avatar child.

Figure 6:
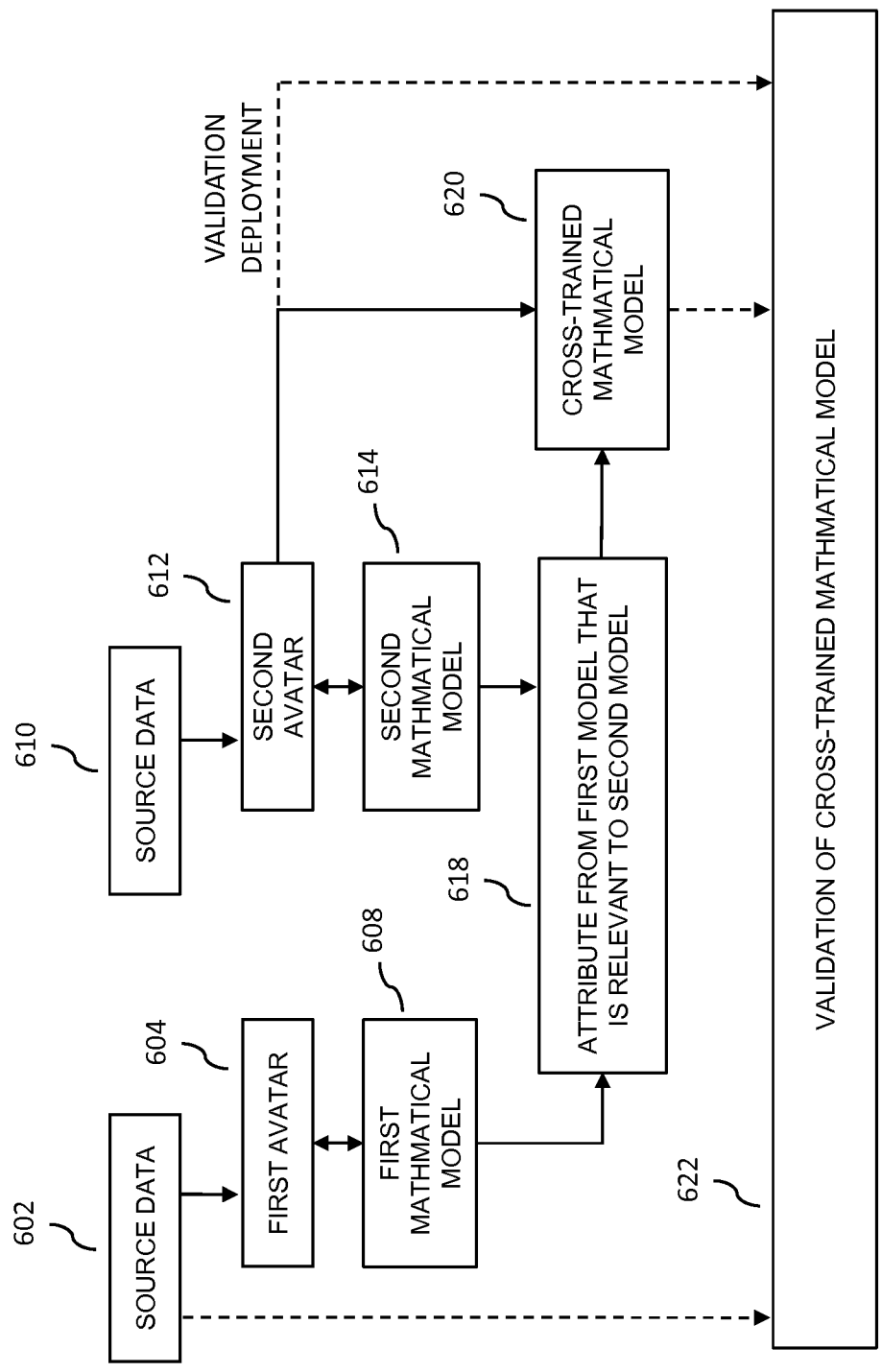
FIG. 6 illustrates an embodiment of cross-training discovery avatars and mathematical models associated with discovery avatars.
Figure 7:
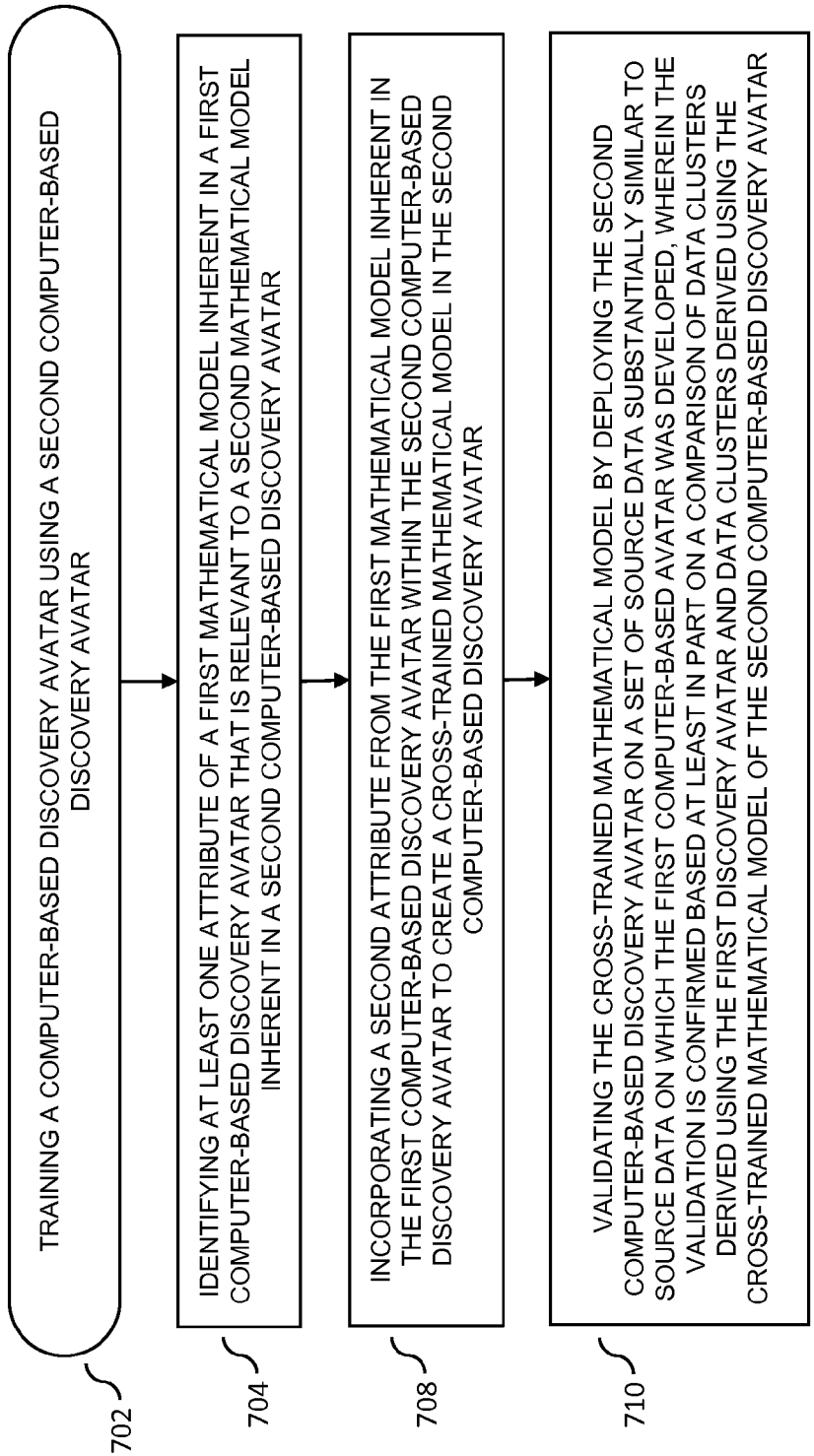
FIG. 7 illustrates steps for cross-training and validating discovery avatars.

Referring to FIGS. 6 and 7, in embodiments, a plurality of source data (602, 610) may be used to create a plurality of discovery avatars that may be used to cross-train each other, resulting in a cross-trained mathematical model 620 that may be utilized by at least one discovery avatar. In embodiments, an attribute 618 of a first mathematical model 608 inherent in a first computer-based discovery avatar 604 may be identified that is relevant to a second mathematical model inherent in a second computer-based discovery avatar. A second attribute from the first mathematical model inherent in the first computer-based discovery avatar 604 may be incorporated within the second computer-based discovery avatar 612 to create a cross-trained mathematical model 620 in the second computer-based discovery avatar 612. The cross-trained mathematical model 620 may then be validated 622 by deploying the second computer-based discovery avatar 612 on a set of source data 610 substantially similar to source data 602 on which the first computer-based avatar 604 was developed, wherein the validation is confirmed based at least in part on a comparison of data clusters derived using the first discovery avatar 604 and data clusters derived using the cross-trained mathematical model 620 of the second computer-based discovery avatar 612.

In embodiments, the relevance of the at least one attribute may be based at least in part on a quantitative association to a substantive topic inherent to a data source.

FIG. 7 illustrates steps for cross-training and validating discovery avatars. In 702, a computer-based discovery avatar can be trained using a second computer-based discovery avatar. In 704, at least one attribute of a first mathematical model inherent in a first computer-based discovery avatar that is relevant to a second mathematical model inherent in a second computer-based discovery avatar can be identified. In 708, a second attribute from the first mathematical model can be incorporated thereby creating a cross-trained mathematical model in the second computer-based discovery avatar. In 710, the cross-trained mathematical model can be validated by deploying the second computer-based discovery avatar on a set of source data substantially similar to the source data on which the first computer-based avatar was developed. The validation can be confirmed based, at least in part, on a comparison of data clusters derived using the first discovery avatar and data clusters derived using the cross-trained mathematical model of the second computer-based discovery avatar.

The present invention utilizes what is referred to herein as a curiosity engine, which operates using distributed, scalable supervised and unsupervised machine learning routines. In an example embodiment of the curiosity engine in use, suppose a research team at an institute is researching human rights in the Middle East. The team wants to learn more about human rights abuses in Iran and they are using the curiosity engine to conduct research. The team, a group of 5 analysts, begins training an Avatar on the subject of human rights abuses in Iran, in this instance referred to as 'Avatar 18'. After sufficient training, Avatar 18 will be able to test documents for their applicability to the topic of human rights in Iran and present the most important ones to the researchers. Two of the analysts are working out of a DC office, while three of them are stationed in New York. In this example, the system allows these researchers to evaluate the same stream of data in real time, and collaborate on the evaluation process and training of "Avatar 18," an example discovery avatar, based on the methods and systems described herein, that functions as their research assistant. The system also allows the researchers in DC to access the data stream from their personal computers, via the system as provided online, providing them access to a data source that would otherwise only be accessible from the New York office. Once the researchers have assigned the question of human rights abuses in Iran to Avatar 18, the software immediately presents them with a queue of documents to evaluate. While the users' interface with the software may be designed to be very simple and straightforward, there may be various functions and modules of the system executing behind the scenes that enable the avatar to present the queue for feedback and begin the training process. For example, such a system may use an extract, transform and load (ETL) tool such as TWISTER®, a relational database management system such as POSTGRES®, a distributed storage system such as HADOOP™ and a machine learning, data mining and analytics platform, such as MAHOUT™ each such function or module having a wide range of features and capabilities known to those of ordinary skill in the art.

In embodiments, a Curiosity Engine, as described herein, may include a plurality of functions and processes, such as ingestion, extraction, and vectorization, clustering and bootstrapping process, user feedback, discovery avatar training, testing documents and scoring. It may also include a user interface; queue cycle, cap training and updating; and the like.

In embodiments, the Curiosity Engine may leverage existing hardware, software, and whatever other collected data it has been assigned. The avatar waits at the Pantheon, where data enters the software, to ingest this data and extract features from the provided text. The avatar may extract all features unless a custom feature list has been created. The default extraction may be a white space tokenization. The software then transforms these features into a series of vectors. For example, the vectorization process may be done using SQL commands and tf/idf weighting (term frequency/inverse document frequency). Using an ETL tool, the newly created vectors are moved into a relational database management system for storage. Also using the ETL tool, the vectors may be transferred into the analytics platform for computation. While the RDBMS stores the extracted features, whole documents may also be stored in the distributive storage system and indexed, such as by SOLR® by APACHE®. All of this may be done within the Curiosity Engine software before the user is ever presented with a queue of documents.

Figure 8:
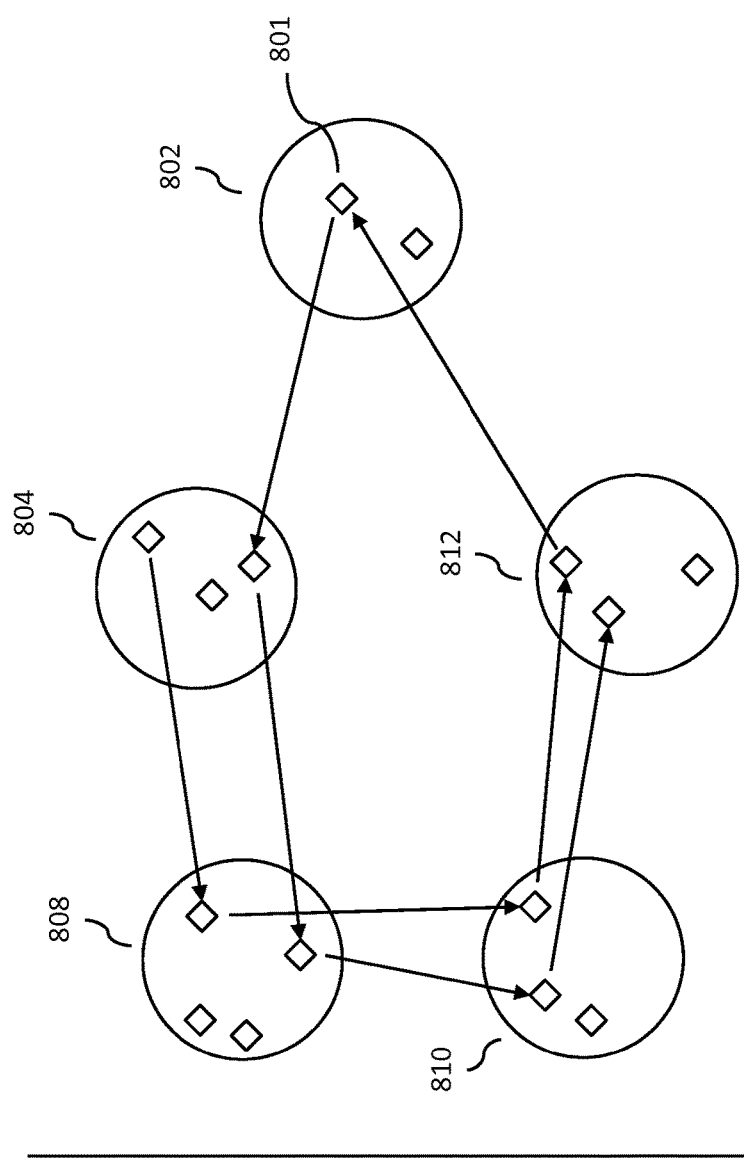
FIG. 8 illustrates a simplified diagram of bootstrapping and data clustering.

Referring to FIG. 8, once the documents and features have found a storage home, the system may begin to create an initial queue of documents to present to the user. Since the researchers may just have begun working with the avatar, the avatar has not been trained on the topic yet. It has not formed an opinion of the topic that would enable it to classify documents. The avatar may need to present an initial queue to the users and evaluate their feedback in order to commence training and develop its own understanding of the topic. To create the initial queue, the software may implement a k-means clustering approach, where K may default to 5. Through this approach, combined with LDA and topic modeling, the software may find clusters (802, 804, 808, 810, 812), or clouds, of objects 801 in n-dimensional space. The system may provide a path through the entire corpus by choosing the largest magnitude object in cluster one, such as determined using Euclidean metrics, then the largest magnitude object in cluster two, and so on, through clusters. The system may then present those in order to the user, such as documents 1-5 of the initial queue. In this instance, the sixth document may be the second largest magnitude object in cluster one, and the seventh document the second largest object from cluster two, and so on. In embodiments, this may be the bootstrapping process that constitutes the initial queue.

A user may label each document presented by the discovery avatar from the initial queues, such as by answering 'yes' or 'no' to the document. After a certain number of labels have been applied, the machine may begin testing documents. Continuing the example embodiment of researching human rights in the Middle East, Avatar 18 may now have generated an initial queue to present to the team of researchers. Members of the research team in both New York and Washington may be presented with the same five documents at the same time, and allowed to label them 'yes' or 'no.' This interaction may allow the researchers to intervene and confirm whether or not the document is relevant to Avatar 18's topic, human rights in Iran. With every response, researchers in both locations make the avatar more intelligent and build up the new avatar to be more intuitive, participating in a collaborative process with their long distance counter-parts and the computer. This allows for a convergence of computer speed and human intuition.

The system may now interpret the user's feedback to begin training the discovery avatar. Every user response trains the avatar and improves its ability to classify documents. The avatar is constantly updating its queue, presenting ever more relevant documents to the users, and the like. After several user responses to the documents, the Avatars training process may be evolved enough that the software can create a mathematical equation around the question of human rights abuses.

Testing may occur once the avatar has been trained, such as when users have given the avatar sufficient feedback, the avatar creates a hyper-plane inn-dimensional space, such as using Support Vector Machines (SVMs). This plane may serve as a dividing line for classifying documents. The SVMs may create an algorithm after sufficient user responses, to decide the maximum margin hyper plane based on the existing set of vectors. The hyper plane is an n dimensional object existing inn dimensional space, and functions as the separating plane between vectorized documents the user will find useful and those the user will not find useful. This is the document testing process, wherein the documents (now n-dimensional objects) are tested against the hyper-plane. The objects may land on either side of the plane, which will determine whether the corresponding document will be important to the user. The system may then use SVMs to begin the dynamic scoring process, in which a score may be assigned to the document based on the object's distance from the hyper-plane. This score is a measure of certainty based on the objects positioning relevant to the plane. The greater distance an object is from the plane, the more certain the Avatar can be that it belongs on that side. Every document may go through this same process, and the Avatar presents the users with a queue of the most important and relevant documents, with their scores listed. The user may then respond 'yes' or 'no' to the document, and the system will learn from each user response and retrain the model periodically. Each hyper-plane may be attached to one topic, but there can be many planes in one space with the same vectors, allowing the user to research multiple topics of interest at once.

Figure 9:
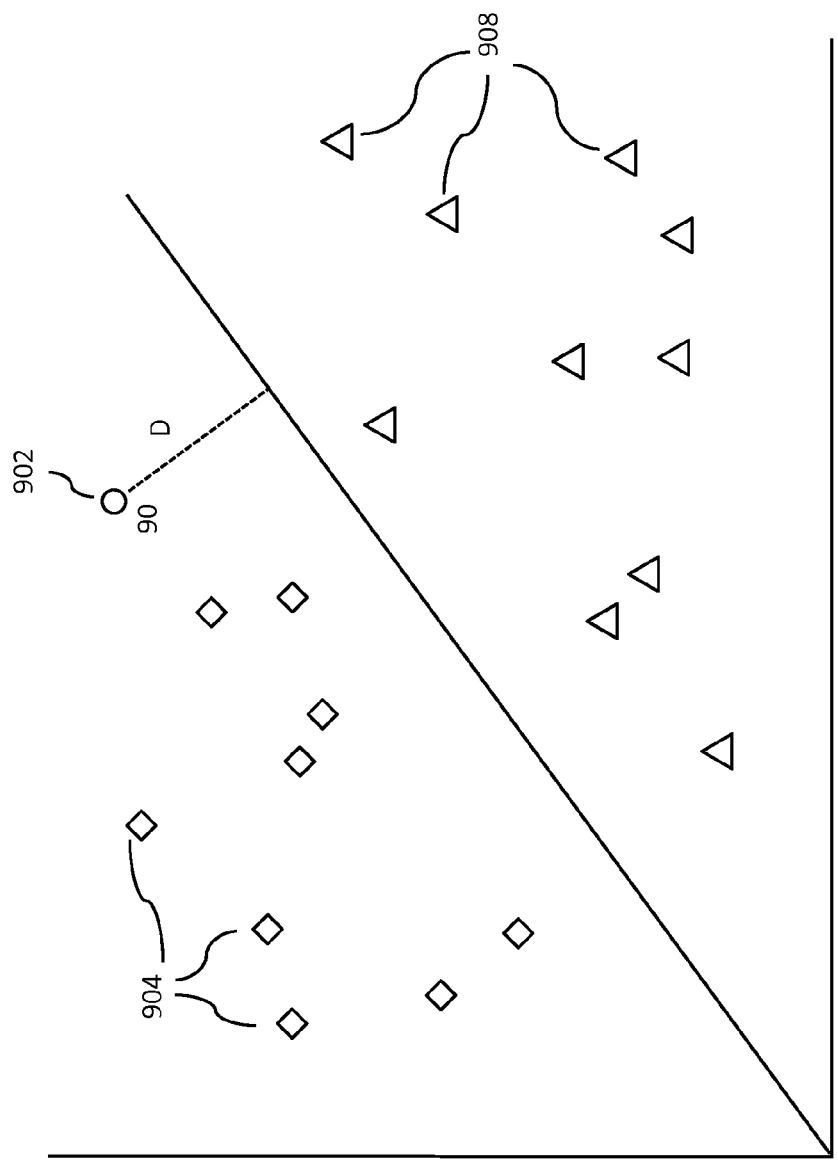
FIG. 9 illustrates a support vector machine testing diagram.

FIG. 9, illustrates an SVM testing diagram, where positively labeled vectors (902, 904) appear in the upper part of plane and negatively labeled vectors 908 appear in the lower part of the plane. The support vector machine has drawn a black plane in between the negative and positive vectors, which is illustrative of the training process. In this example, a vector is a new document 902 that has not yet been labeled by the user. In this instance, the system has estimated that this new vector will be positive, but is awaiting user feedback to confirm or reject that hypothesis. The system has given this new vector a score of 90 based on (D) its distance from the plane, which is a measure of the system's certainty of its classification in the plane.

As the user begins to interact with the queue, the supervised learning process begins. With every yes/no answer from the user, the machine learns, and can more accurately divide vectors into either side of the hyper plane. Every new queue presented to the user may provide documents that are more pertinent to the research question. This prevents the user from poring over useless information throughout the research process, saving the user time and energy. The avatar will learn from each analyst's input and apply a new score to the document through averaging each analyst's response. User responses make the avatar more intelligent and more insightful, allowing it to generate more relevant results. Each analyst's interaction with the avatar may be recorded, allowing long distance analysts to benefit from each other's intuition and expertise through collaboration with the avatar.

While the human intuition of these expert researchers is superior to that of a machine, the experts are still vulnerable to human error, and at times mislabel documents. For instance, say one analyst, Kim in New York for instance, has labeled four different documents 'no,' while every other analyst felt those documents were highly relevant. Since all four other team members agreed the documents were a yes, and the avatar applies the average of the analysts' responses, Kim's mistaken responses do not seriously distort the avatars results. However, were multiple analysts to consistently mislabel documents, the avatar would send up a red flag, alerting users of repeated inconsistencies between the computer's calculation and the users' intuition. Because Kim has repeatedly mislabeled documents, her manager is able to examine a record of her responses, kept by the avatar, and compare them to the responses of her other team members. This data may give the manager insight into Kim's responses, so he or she can evaluate the quality of Kim's feedback and evaluation of documents.

In embodiments, every new label ('yes' or 'no' to a document) generated by the users may indicate the need for new vectors or new training of the avatar. With every new label, the avatar will improve in its ability to identify important documents. The curiosity engine will also constantly receive and examine new documents, and apply them to the particular avatar (e.g. Avatar 18), and any other avatar the team has created.

Once the research team decides it is thoroughly content with avatar's queue results, they can choose to memorialize the avatar's learning process so that it ceases to be changed by user feedback, preventing its now 'perfected' judgment from being tainted. The avatar will continue to identify new documents as they come in and present them to users if they are important. The avatar will apply the memorialized model to incoming documents and present the user with the option of adding that document to the corpus.

After training the avatar for a period of time, the team may agree they are consistently satisfied with the results presented by the avatar. As a result, the team may decide to cap training on the avatar, where the avatar may retain the information it has learned and continue to present them with new and relevant documents as soon as they arrive. In the example embodiment of researching human rights in the Middle East, the team may submit their report on human rights abuses in Iran, but keeps Avatar 18 in the system for future reports. The trained avatar may be passed along to researchers in different departments or handed down to future analysts researching a similar topic. In this way, the system may allow the institute to retain the expertise of the human rights in the Middle East analysts, even if they are no longer working with the institute. Now that the human rights team has moved on, each member of that research team may have joined a different research team, each created new avatars for different topics, as they are able to create avatars for as many topics as they desire. Avatars may also cross train each other, and inherit knowledge from other avatars. Through this cross training system, the avatars may eventually begin to find correlations between topics, securely identifying topical parallels between and within research teams. This system of avatar cross training and inheritance enables the system to leverage the domain knowledge of all participants.

In embodiments, the present invention may be applied across multiple market verticals and product adaptations. While the user interfaces and intended audiences for each of these alternatives may vary slightly, the underlying processes and technology may be substantially the same. The following are examples of different applications of the methods and systems described herein, and are provided as illustrative embodiments, and are not intended to be limiting in any way.

In an embodiment, the present invention may be used in an advanced text mining and machine-learning tool, and discovery avatar, that is designed specifically for determining an industry trend, one example, referred to herein as 'Trendix™,' being an avatar for determining fashion industry trends. It should be understood that references to Trendix herein are not intended to be limited to the fashion industry, but could be applied in the context of using an avatar as described herein in connection with any of a wide range of processes for finding trends in a wide range of industries. Trendix or a trend-discovery avatar may leverage the system of the present disclosure's content discovery capabilities, and introduce new capabilities of its own geared towards a particular industry, such as the fast-paced world of fashion and marketing. While most software tools created for the fashion industry are fashion design software or for product management, Trendix may serve fashion journalists, marketing executives, critics and editors to monitor market sentiment, identify trends, and make the research process easier and more efficient.

Continuing the example application of the present disclosure, Trendix is a comprehensive tool that leverages user feedback from online users and professional experts, as well as image recognition software, to identify trends and provide the user with exactly what they are looking for, be it an article, a blog entry, an image, a pair of shoes, a specific report, and the like. When investigating a report or trend, Trendix participates in the content discovery process with the user. For instance, a Trendix fashion assistant will scour the web or your data source for text and images and present the user with the most pertinent pieces to an assigned topic. For marketing, PR, quality assurance departments, and the like, users may quickly train their Trendix avatars to retrieve information mentioning their company as soon as it is published online. Trendix may also help users identify trends and spot patterns. For instance, instead of spending hours poring over thousands of images from Fall Fashion Week, a user may allow Trendix to alert them of recurring themes. Users may even ask it to identify the occurrence of certain themes.

Understanding a user's clientele and monitoring market sentiment may be made easier with the present invention. For instance, by adding a small Trendix plug-in to a company's website, a user's customers may provide instant feedback on looks, items, consultants, and the like. This may allow the user to improve user interaction with the website, find hidden correlations among user preferences, leverage user feedback to recommend specific items they will most likely purchase, instantly assess what is important to customers, and the like.

In embodiments, Trendix may allow a user to intelligently archive images and data. Using Trendix, a user may be able to organize photos, articles, BI, and the like, by creating themes. For instance, themes may be as general as 'floral' or as specific as the 'May 2011 Sales Report.' As new data comes into the enterprise database, the system's software will be able to locate where it is stored.

In embodiments, Trendix may allow experts within the company and consultants to train 'avatars' on any number of topics, where the avatars may be able to inherit that expert's knowledge, to then be used by another. In this way, all employees may be able to receive indirect feedback from executives, designers, consultants, and the like.

In embodiments, Trendix may provide a comprehensive software tool that augments the creative process, allowing users to monitor market sentiment, identify trends, intelligently archive data, understand client preferences, leverage expert knowledge, and the like.

In an embodiment, the present invention may be used in a social product that enables consumer cliques to explore the Internet socially, referred herein as 'Loops'. For instance, Loops may hand-deliver fresh content to its users every day. Loops may be implemented as a software as a service (SaaS) direct to consumer, where the user base may expand to millions. Loops may be applied to individuals who search the web blindly every day, gossiping with friends, looking for new products and gathering news from a vast sea of unassociated content. Loops may manage all of this data for the user, providing new way to manage web content, where Loops may be able to deliver only what users want and how they want it. In this embodiment, avatar may be an artificial intelligence engine that searches the web/corpus and seeks out content, scores it for relevance, then offers it up for consumers, and where a 'caster' may refer to the owner of an avatar. In other application-specific nomenclature, a 'clique' may be a set of people who have friended an avatar and/or people, and may be open/closed by the caster. A Loop may be the content provider by the avatar after having been trained by the caster. A user may be able to see their loops and top topics, be able to view their own profile information, search and view loops they don't subscribe to, see lists of other people in a given clique, see the history of an avatar, and the like.

In an instance, many users of the web may be passive users, but want to be informed and entertained. The Loops may provide an innovative business model that capitalizes on the way users use the web, where currently only about 1% of users 'discover' (Community-Casters) and about 9% contribute content (Community Builders).

The Loops may offer an artificial intelligence driven look-ahead facility that anticipates user searches and learns from a user's responses. Community-Casters may train avatars to understand their tastes and preferences, such as using Facebook, Consumer Reports, Twitter and other sources as their inspiration. Once trained, it may be released to explore the web.

Community Builders may 'friend' the avatars and instantly become part of a social network around specific, identifiable and fresh topics. For instance, a user may subscribe to the 'New American Cars' Loop to find what's coming in the 2012 season. A user may unsubscribe once they've made a purchase. A 'builder' may mentor the Avatars and provide feedback. Friending an Avatar may allow a user to get to the top most important items of the day, not just those that match a keyword such as in a general search. For instance, an Avatar should not be fooled by search engine marketers or search engine optimizers (SEM/SEO) because it knows where the actual content is. Additionally, an avatar will 'talk' to and learn from a friend's avatars. This avatar interaction will provide otherwise hidden correlations and insights, and make each avatar more intelligent.

The interactive nature of the avatars, as described herein, means they may be continuously refreshed, with content that is up-to-date. Users may rotate frequently through avatars. Users may subscribe to "Cell Phone Reviews" before they even begin to search for content on the web, potentially providing deep insight. Unlike traditional metrics, the Loops may determine what a user is shopping for as they search.

In embodiments, the present invention may include a plurality of features and functions, such as a plug-in look-ahead facility, incremental additions to the corpus, caster ratings of documents, dynamic scoring, brain queue integration, avatar-level custom dictionaries, avatar management system, sharding, search integration, child avatars, redaction, annotation, agreement, importance slider, post loops, ad rail and sponsorship, options to browse and follow certain loops, options to browse and follow certain casters, ability to drop loops, collective-based learning, Facebook interface, a user rating facility, document uploads, avatar-level custom features, avatar-level named entity extractors, themed avatars, blogging, comments on avatars, caster profiles, consumer profiles, avatar recommender and suggestion facility, social media interface (e.g. Twitter, Email, mobile phone, tablets), community interaction and policing, context and topic based facility, and the like.

In an embodiment, the present invention may be used in an open configurable platform for servicing individual online users as well as companies. For instance, individuals may be able to access the site for free, such as the user of the Loops as described herein. These users may be able to create a finite number of avatars on topics of interest. The metadata generated from this activity may enable targeted advertisement sales and revenue. For enterprises, they may have the option to consume community-donated modules for a portal, create their own custom portal, engage pro services team to create one for them, and the like. This open platform may create a multifaceted, multidimensional site with multiple uses, where it may differ from formal research tools as described here, and may be driven by social consumption, market comparison/analysis and sentiment analysis. It will also be highly configurable and malleable depending on the community.

The open platform may be community driven, such as created to grow with user contribution. Users may be able to write their own applications, share or sell them on the system website, and the like. This may engage users and create a more robust tool. Users may write and create their own front-end configurations, enabling the product to be malleable and desirable to a wide range of customers/users. Users may be able to sign into their own social media sites and stream those feeds directly through a system portal, so if the user is signed up in a social network (e.g. twitter, Facebook), for example, they may be able to access their own feeds on our platform. A feature of open platform may be a price comparison facility, such as in Amazon's Price Check application. This may enable users to create customized avatars based on their shopping preferences, which may present them with the best deals, sales, coupons, and the like, every day. In embodiments, users may follow particular products, styles, companies, and the like.

In embodiments, the Loops facility, as described herein, may be implemented in open platform. For instance, while enterprise users may pay for use, individual users may be able to use the product for free. They may have a finite number of avatars they are able to create, but may essentially be able to use the tool to follow artists, ideas, sports, stocks, news, and the like, of particular interest. The system may also monetize metadata from these hyper customized avatars by selling targeted impressions on the site.

In embodiments, the open platform may be customizable, which greatly expands the possible use cases for the present invention. For instance, enterprises may use internal departments to create a UI and plug-ins for the tool, engage a pro service time to create or consult for them, and the like.

Additionally, using open platform, enterprise users may be able to create avatars for all of their products, where avatars may monitor blogs, articles, yelp, and other social media for what people have to say about their product, and the like. In this way, a user may track sentiment for their products as content is published, in real time. This may inform their new product lines, marketing campaigns, overall strategy, and the like. They may also create avatars per user, per product, per brand, per market segment, per location, and the like, or a combination of these.

In an embodiment, the present invention may be used in a dating service. For instance, while most current dating services have their own unique matching algorithms, none function in a manner similar to the present invention such as where the core technology is able to interpret and leverage preferential feedback from users to enables the system to present the most personalized matches to users. In addition to presenting users with true potential matches, the system learns from user's opinions of every match, before and after meeting them. Every time a user evaluates another user, the system may progress closer to finding them their ideal match. This evaluation may be derived from a meeting, their profile, online chatting, and the like. Additionally, the models the system creates from user inputs can interact with each other, and discover more about prospective pairs. In embodiments, the system may employ a supervised machine learning technique, which adds a personalized, human touch to the online dating experience as implemented by way of the present invention. In embodiments, this system may be implemented as an add-on service to dating service sites, and may complement existing matching algorithms used by dating service sites.

In an embodiment, the present invention may be used in the development of a food related application, referred to herein as 'Flavor-marker', which aggregates images, recipes, menus, reviews, blogs, tweets, and the like, from the Internet to bring users a personal 'flavor profile' from their tastes as derived from the Internet. For instance, the community of food blogs and community-reviewed restaurants has exploded in recent years, and there is a wealth of food-related data on the Internet that caters to a variety of needs and interests. Flavor-marker seeks to customize the online food experience of users, enabling them to train avatars to remember the kinds of foods, restaurants, recipes, nutritional information, data sources, and the like, that they prefer. This potentially creates a more enjoyable and efficient experience for users, as they may be able to quickly identify where to eat for dinner, what to make for a pot luck, how many calories is in a meal, and the like. Flavor-marker may be able to learn from user feedback, using the system's core technology, and generate models with knowledge of users eating habits, favorite locations, frequented eating spots, and the like. Flavor-marker leverages user feedback and identifies the users' particular array of preferences, such as though a home computer, a mobile device, a mobile phone, a tablet, and the like. Then, the tool may utilize community data relating to food, restaurants, nutrition, and the like, and proactively provides the user with access.

In an embodiment, the present disclosure includes a legal discovery avatar that may be used in a litigation application, referred herein as 'POWER BARRISTER™' aiding litigators or other parties handling dispute resolution, legal investigations, administrative investigations, or the like. References to Power Barrister should be understood, except where context indicates otherwise, to refer to any legal discovery avatar that can be used to assist a legal analytic, forensic, or investigative process. Parties conducting such processes are often faced with hundreds of thousands of emails and the legal obligation to examine every one of them. Power Barrister makes e-discovery efficient and defensible. For instance, an on-site installation may tie into professional services information technology infrastructure or user interfaces, such as through an SAAS model. Power Barrister may enable lawyers to quickly sort through large amounts of data, from the earliest stages of discovery to the final ones. A Power Barrister avatar may aid attorneys define their case corpus, and once it has been defined, help lawyers develop an intimate analytical relationship with the data. Moreover, it may enable users to collaborate, redact, highlight, train and share information together.

An example how an attorney might use this tool in discovery, such as in reviewing a large volume of emails, is now provided. Suppose an attorney is working for a large law firm, and are tasked with sorting through an Enron email set for the first time to prepare a case against the corporation. The attorney will be attempting to gather incriminating evidence and proof of fraud against the company and its executive officers. First, the attorney signs in, where the attorney already has the Enron data set uploaded into the system, where the process of uploading may be implemented by dragging the files into a desktop folder, by having an administrator upload the files, by having the files upload to a location where users can choose which file when creating an avatar. The attorney then creates a new avatar that they will train on this data set, as well creating as many avatars as they want, but at first creating at least one general avatar to get started, as this is the first phase of discovery. The attorney may be able to utilize the user interface, and further, through a management tab thereof, and select "Create New Avatar", where they may insert the name, description, keywords, and any other team members they'd like to add. However, before they do so, they may want to run a quick search on keywords to make sure the avatar is going to retrieve relevant results from the dataset. For instance, the attorney may search on the keywords 'fake,' 'false,' 'fraud,' 'sell shares,' 'wire' and 'blackouts', where the system should generate several results.

Now that the attorney knows the data set is compatible with the avatar they'd like to make, they may finalize the creation of this avatar and begin the process. In this instance, the attorney may choose to title this avatar 'Enron: Insider Trading.' They'll need to navigate out of their management tab and back to 'My Avatars' tab. Here, they may see the avatar just created and if they double click on it, it will open up their Document Viewer for this avatar.

The attorney may then be presented with a unique queue of documents from the Enron data set that is relevant to their search for scandalous information. Each document may be presented to the attorney in the queue with its name and a score. The tool, based on the documents' relevancy to the specific avatar they have created, may generate this score. When they click on a document to view, its content appears in a viewer below. They may skim the document, search it for specific content, and then label the document a 'yes' or a 'no,' depending on whether or not they think it's appropriate for what is being searched for.

As the attorney continues to skim other documents and score them, the system is learning and understanding better what they are looking for. It interprets the attorney-provided labels and becomes capable of imitating the attorney's decision-making process. The system will automatically update the document queue as its knowledge of the attorney's search needs becomes more refined. As the attorney proceeds through the process, they may be able to check to see what kinds of content the software thinks they're looking for. To do that, the attorney may check a "Tag Cloud" tab in the document viewer, and doing so, may see the words the system has identified that are associated with the positively labeled documents by the attorney, such as LJM, Arthur Andersen, California, Kenneth Lay, and the words identified with the attorney's negatively labeled documents, such as lunch, date, family, business. This feature may provide the attorney with a good sense and visualization of how the system's interpreting the attorney's answers. In embodiments, Tag clouds may be generated by the creation of an F-Test in, for example, SQL code. The F-Test enables the system to call on the most relevant and most irrelevant concepts, words and phrases identified in a discovery avatar model. The information generated from this command may then be revealed to a user, providing them with a visual representation of their discovery avatar's current modeling. The user can choose to view both their negative and positive clouds, in which case one cloud will show all the positively identified concepts, with the most relevant ones being the largest, and the sizes of the words decreasing from there. The same would be true of the negative clouds, only the most irrelevant words would be the largest. Conversely, the user may choose to view one cloud, in which the relevant terms will be the largest and the negative terms will be small. The user can see in visual terms what ideas the model has elicited from their feedback as negative or positive, and gauge their discovery avatar's agreement progress. A user may adjust the weight and therefore score of the words presented in their discovery avatar. If they note that a term is appearing as relevant that is definitely not, they can provide input to their discovery avatar and teach it that this word means nothing to their current topic.

Now, as the attorney continues labeling a few more documents, may come across a concept that they want to know more about, such as "mark to market accounting." So, the attorney may take a break from labeling documents for a moment, and go to the search bar and search for this term internally (within the Enron corpus) or externally (on the web). In this case, the attorney chooses to search both. By doing this they may generate web information on this concept so to learn more about it in general, and also other documents that reference it so they can learn more about its relevance to Enron. They may also use the user interface chat feature to ask someone else on their team about "mark to market accounting." In this case, they decide to chat with Katie, who is on the legal team training this avatar with them. The attorney sees that she is online and I can send her a quick question about this concept. In this case, it turns out Katie has already developed some domain knowledge on this concept, and she can provide some insights on Jeff Skilling, Enron CEO and his ideas on mark to market. As a result of her insights, the attorney may be more thoughtful with their own document scoring.

As the attorney works, the system is keeping track of the collaborative progress between the attorney and the avatar, that is, how much the attorney agrees with the queue presented. Before long, the system may have determined that the attorney and the avatar are in sync with one another, such as in agreement over what the content of the queue should look like. At this point, the avatar may alert the attorney that it is time to stop training, at which time the attorney may stop labeling the documents. The attorney may check their Tag Cloud now, refresh the cloud, and check how it is refined to better reflect the attorney's needs in the data.

For instance, positive words may now include 'insider trading,' 'California Blackouts,' 'India,' 'cooking books,' and 'skim,' 'scare' and 'steal', while negative words may include 'dinner,' 'graphs,' 'travel,' 'chat' and 'space.

But even though the attorney stopped training the avatar, it still presents them with relevant documents and the attorney continues their discovery process. The attorney continues to read over the documents and extract the most important pieces of information from this large dataset. Using the model the avatar has created (which it built off the attorney's own knowledge), the attorney may be able to quickly find the most critical information for the case against Enron.

Once the attorney has gone through a large percentage (e.g. 90%) of the relevant content on the Enron data set, the avatar may prompt the attorney with the option to either complete the review, at which point the attorney may delve deeper into the positive documents and begin constructing a case, or, the attorney may choose to launch a Google search on the search string the avatar has developed around the topic the attorney is working on. If they chose to do that, they may continue to do a bit more research online, with a refined, intelligent, and thoughtfully constructed search phrase. If the attorney stopped working with their 'Enron: Insider Trading' avatar, for a few hours, a few months, and the like, the models will persist. This means, if in a week from now the firm receives a new revealing document on the corporation, the avatar will be evaluating the data stream that ingests that new document, and will automatically alert the attorney of the document.

If the attorney were to continue to train an Enron Avatar simultaneously with Katie, the other user, the attorney would be able to view the version of training their queue is currently running off of. In embodiments, while Supervised Training automatically updates, it may not always run in parallel with each user's latest label. In order to stay apprised of what version of incoming labels the system's training is based off of, users may be able to check the version of training their queue is running off of.

In an embodiment, the present invention may be used in a pharmaceutical application, such as for drug safety and pharmacovigilance, which has become increasingly complex and dynamic. Health organizations must comply with a growing amount of legislation requiring them to securely manage and report adverse event data. These organizations not only must comply with myriad legal and ethical responsibilities, they must also adjust to the changing dynamics of health information available on the Internet. More and more health information is now available online. For example, in 2010, health care providers spent $88.6 billion on electronic health records (EHRs) alone. Patients and medical organizations alike now have access to a wealth of data online, and access to experts as well as patient feedback on social media sites. The present invention enables the accessing and analyzing of this data more efficient and manageable.

In an example, the present invention may be applied as a pharmacovigilance tool for a large pharmaceutical company. In this example, a team of researchers at the large pharmaceutical company working in the product safety department are assessing the risk level of a new diabetes drug. The team is scouring endless quantities of consumer reports, EHRs, CPOEs, clinical trial results, online journals, medical reports, blog entries, social media sites, emails, and various other files to comprehensively assess the safety of the new drug, and monitor any adverse effects. Assume the drug has been on the market for four weeks and this team is in charge of post-marketing surveillance and pharmacovigilance. Not only is the team in charge of assuring the product's safety for the public, the drug company is legally obligated to alert regulatory authorities of any adverse effect reports received by the company. This requires the team to thoughtfully sort through references to the drug online as well as mail from consumers, insurance companies and doctors.

Drug safety monitoring is a very important task in the world of pharmaceuticals, and one that often proves very difficult to accomplish comprehensively. Surveying adverse effects requires access to high volumes of sensitive data, including patient records, web postings and medical reports. Not only do organizations need access to data, they need to be able to understand and evaluate it quickly. The Supreme Court has affirmed that pharmaceutical companies are legally allowed to access patient prescription records. The need for sophisticated assistance in mining this data is evidenced by countless pharmacovigilance and drug safety organizations, as well as the FDA's multi-million dollar investments in agencies to help monitor the safety and effectiveness of drugs used in the U.S.

The present invention may be used to provide a pharmaceutical tool for advanced analytics and text mining that will help intuitively and rapidly sort through the data. Using the pharmaceutical tool, the team is able to extract the most serious reports of drug's adverse effects and report them immediately, allowing the team to file reports into categories depending on severity and symptom type. The team may be able to specify exactly what categories the drug data should exist under, and create as many topical categories as deemed necessary. The team is not limited by a certain amount or by pre-determined, narrow category themes.

In this example, assume the group working on the drug has currently created one topic using the pharmaceutical tool, "Drug Safety Supervision, Post Marketing: Severe." Their avatar will now scour their database and the web for important information pertaining to this topic, and present the team with a queue of data, including formal user reports, medical reports, and informal user reports of adverse effects on social media sites. The system may ask each member of the team to respond to each piece of information presented. Each researcher may verify whether or not data items in the queue is serious enough to require immediate reporting, or if they'd like to label it as useful for a different category. With each user response, the software becomes more perceptive and intelligent, and constantly presents newer, more relevant information. This supervised learning aspect prevents technological inaccuracies from affecting the drug user. In an industry where the outcome is life or death, this feature is critical. While the system makes data analysis more efficient and expedient, it encourages careful thought by the user.

In this example, the research team is able to access time-sensitive information that is otherwise difficult to locate. It may allow for the users to find hidden correlations among data, leading to early prevention and detection of symptoms, side-effects, and illness. After only a short time working with the pharmaceutical tool, the researchers may note results, such as users over the age of 45 in several states across the U.S. reporting hand and feet swelling and shortness of breath while on the medication. The team may, in a timely manner, compile accurate reports that detail the most important cases of adverse effects and symptoms. The system may aid the researchers in finding connections among consumer experiences across the globe. This may allow the researchers to come to more comprehensive conclusions about the drug's safety, where the pharmaceutical tool may provide for an efficient method of finding relevant data, archiving information, keeping track of incoming reports, surveying critical information about medicine from users all over the web, and the like.

The system may provide a useful tool for the researchers at of the drug company, but it can also move beyond the realm of pharmaceuticals. The system may be used by pharmacovigilance organizations, WHO and other health organizations, hospitals, medical research centers, medical schools, and medical journals. Furthermore, the system may have the potential to expand into a participatory medicine tool. As such, the system may operate as a virtual community for consumers, pharmaceutical companies, and medical experts to enter into a collaborative analytical process. The system may facilitate online collaboration among these different contributors, who could all contribute to the training process. Experts as well as users of certain drugs may be able to input their feedback on certain medicines. This information may in turn be used by the pharmaceutical companies to provide a more acute pharmacovigilance.

In order to service the needs of researchers in the academic space, the present invention may provide a research tool specifically for academic research. This tool may cater, for example, to professors, undergraduates, graduate students and other academics. This will be a tool targeted for use at research and academic institutions, which may host the tool on computers in libraries, classrooms, research labs, offices, and the like. Users may be able to save their research avatars under their user name and access them again from any computer installed with the software. The tool will have the capability to ingest client's existing data feeds, including journals, online periodicals, digital books, social media and RSS feeds, and other data. Streamlining the users' data, the system may make the research process simpler and more intuitive. By leveraging users' responses to data, the tool becomes more intelligent and capable of making better decisions on the data as it is streaming in.

This tool may be exceptionally useful for the preliminary research process and for long-term research projects. In terms of the initial review process, this tool helps the user perform initial inquires to determine what they are truly looking for, even though the users themselves may not be exactly sure at the onset. This will help researchers focus in on a thesis faster than the traditional research model may allow. For long-term research projects, the users may find the system especially helpful, as it will alert the user of important documents, books, articles or other data as it becomes available. This potentially not only reminds the user of perhaps an older project, but also keeps them alert and up to date on the most relevant new information and discoveries.

The present invention may utilize the system's unique text mining facilities to help marketing departments and businesses maximize their consumer data. Using a SAS model, this product may enable the development of custom algorithms and functions around consumer data in order to rapidly perform predictive analytics and identify market segments. A large part of this process may involve sentiment mining. Users will be enabled to train avatars to detect references to their brand or products. These models will be deployed on the web, scouring social media and community review sites. Two main components of this product will be sentiment analysis and use of sentiment dictionaries. Sentiment dictionaries may be developed in a plurality of languages, and may leverage off of existing languages. Sentiment analysis may enable users to create avatars for their products, where these avatars may monitor blogs, articles, yelp, social media, and the like, for what people have to say about their product. In this way, the user may be able to track sentiment for their products as it happens. This will inform their new product line, marketing campaigns, and overall strategy. They may be able to create a variety of different avatars, such as per user, per product, per brand, per market segment, per location, and the like.

While the invention has been described in connection with certain preferred embodiments, other embodiments would be understood by one of ordinary skill in the art and are encompassed herein.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law. All documents referenced herein are hereby incorporated by reference.

What is claimed is:

1. A method of constructing a computer-based discovery avatar,
embodied in a non-transitory computer readable medium that manages a queue of data stream elements to aid an investigation by an analyst and, when executing on one or more computers, performs the following steps:
tokenizing source data according to a prioritized order,
wherein the source data includes data stream elements of a first size and data stream elements of a second size,
wherein the first size is larger than the second size, wherein the prioritized order allocates a higher priority to tokenizing the data stream elements having the first size than tokenizing the data stream elements having the second size, and
wherein the first size and the second size are with respect to a queue that accumulates the source data;
extracting a plurality of data features from the tokenized source data,
wherein the extracted data features are stored as quantitative vectors;
analyzing the extracted data features using a mathematical model to determine a data cluster,
wherein the data cluster includes extracted data features that share an attribute and includes identifiers that are associated with a plurality of data elements from the source data;
presenting, to the analyst, a first source datum for review, from the plurality of data elements from the source data, based at least in part on the identifiers within the data cluster;
scoring the first source datum based at least in part on its relevance to a substantive topic;
presenting, to the analyst, a second source datum for review, from the plurality of data elements from the source data, based at least in part on the identifiers within the data cluster;
scoring the second source datum based at least in part on its relevance to the substantive topic;
comparing the score of the first source datum to the score of the second source datum;
optimizing the mathematical model based at least in part on the comparison of scores;
storing the optimized mathematical model as a computer-based discovery avatar;
wherein storing the optimized mathematical model as a computer-based discovery avatar includes storing the optimized mathematical model upon reaching a threshold of optimization, accuracy, quality, and merit; and
generating an interface to receive, from the analyst, a search request and to present, to the analyst, the source data based on the computer-based discovery avatar in response to the search request.

2. The method of claim 1, wherein the source data is a stored repository of documents.

3. The method of claim 1, wherein the source data derives from a plurality of distributed data storage repositories.

4. The method of claim 1, wherein the tokenization is white space tokenization.

5. The method of claim 1, wherein the scoring the first source datum is performed by an algorithm.

6. The method of claim 1, wherein the computer-based discovery avatar categorizes the source data based at least in part on the use of support vector machines.

7. The method of claim 1, wherein the computer-based discovery avatar is deployed for use on a second data source to create a second set of data clusters using the optimized model of the discovery avatar.

8. The method of claim 1, wherein the computer-based discovery avatar is deployed for use on a plurality of data sources to create a plurality of data clusters that are scored and used to rank each of the plurality of data sources according to relevance to the substantive topic.

9. A method of constructing a family of computer-based discovery avatars, each embodied in a non-transitory computer readable medium that manages a queue of data stream elements to aid an investigation by an analyst and, when executing on one or more computers, performs the following steps:
tokenizing source data according to a prioritized order,
wherein the source data includes data stream elements having a first size and data stream elements having a second size,
wherein the first size is larger than the second size, wherein the prioritized order allocates a higher priority to tokenizing the data stream elements having the first size than tokenizing the data stream elements having the second size, and
wherein the first size and the second size are with respect to a queue that accumulates the source data;
extracting a plurality of data features from the tokenized source data,
wherein the extracted data features are stored as quantitative vectors;
analyzing the extracted data features using a mathematical model to determine a data cluster,
wherein the data cluster includes extracted data features that share an attribute that is related to a super-set topic, and includes identifiers that are associated with a plurality of data elements from the source data;
presenting, to the analyst, data elements from the source data for review, and scoring the data elements based at least in part on the identifiers within the data cluster relating to the super-set topic;
optimizing the mathematical model based at least in part on a comparison of the scored data elements;
storing the optimized mathematical model as a computer-based discovery avatar parent;
wherein storing the optimized mathematical model as a computer-based discovery avatar includes storing the optimized mathematical model upon reaching a threshold of optimization, accuracy, quality, and merit; and
generating a second optimized model that is stored as a computer-based discovery avatar child based on a second set of extracted data features that share a second attribute that is related to both the super-set topic and a subset topic; and
generating a graphical user interface to receive, from the analyst, a search request and present, to the analyst, the source data based on the computer-based discovery avatar parent and the computer-based discovery avatar child in response to the search request.

10. The method of claim 9, wherein the subset topic is defined by terms that are included in a set of terms used to define the super-set topic.

11. The method of claim 9, wherein the subset topic is defined by terms that are additive to a set of terms used to define the super-set topic.

12. The method of claim 9, wherein the avatar parent is memorialized and locked from further iterative improvement.

13. The method of claim 9, wherein the parent avatar is deployed as an analytic commodity for use on a third source of data.

14. The method of claim 9, wherein the genealogy of avatar parent-avatar child relations is presented in the graphical user interface.

15. The method of claim 9, wherein scoring the data elements includes dynamically scoring the data elements by assigning a score as a measure of certainty based on a distance between a positioning of a respective data element of the data elements from a hyper-plane.

16. A method of training a computer-based discovery avatar using a second computer-based discovery avatar to aid an investigation by an analyst, embodied in a non-transitory computer readable medium that, when executing on one or more computers, performs the following steps:

identifying at least one common attribute of:
        a first mathematical model inherent in a first computer-based discovery avatar; and
        a second mathematical model inherent in a second computer-based discovery avatar;

incorporating a second attribute from the first mathematical model inherent in the first computer-based discovery avatar within the second computer-based discovery avatar to create a cross-trained mathematical model in the second computer-based discovery avatar; and validating the cross-trained mathematical model by deploying the second computer-based discovery avatar on a set of source data including source data from the same source data set on which the first computer-based avatar was developed,
        wherein the source data includes data stream elements having a first size and data stream elements having a second size, and wherein the first size is larger than the second size;

based at least in part on a comparison of data clusters derived using the first computer-based discovery avatar and data clusters derived using the cross-trained mathematical model of the second computer-based discovery avatar, confirming validation of the cross-trained mathematical model; and generating a graphical user interface to present, to the analyst, the source data in a prioritized order based on the computer-based discovery avatar,
        wherein the prioritized order allocates a higher priority to the data stream elements having the first size than the data stream elements having the second size, wherein the relevance of the at least one common attribute is based at least in part on a quantitative association to a substantive topic inherent to a data source;

presenting an initial queue to the analyst; and
    evaluating feedback of the analyst in order to:
        commence the training of the computer-based discovery avatar; and
        develop an understanding by the computer-based avatar of the topic.

\* \* \* \* \*